United States Patent
Meier et al.

(10) Patent No.: US 8,896,629 B2
(45) Date of Patent: Nov. 25, 2014

(54) METHOD FOR REPRESENTING VIRTUAL INFORMATION IN A REAL ENVIRONMENT

(75) Inventors: Peter Meier, Munich (DE); Frank Angermann, Munich (DE)

(73) Assignee: Metaio GmbH, Munich (DE)

( * ) Notice: Subject to any disclaimer, the term of this patent is extended or adjusted under 35 U.S.C. 154(b) by 154 days.

(21) Appl. No.: 13/391,589

(22) PCT Filed: Aug. 13, 2010

(86) PCT No.: PCT/EP2010/061841
§ 371 (c)(1),
(2), (4) Date: Mar. 22, 2012

(87) PCT Pub. No.: WO2011/020793
PCT Pub. Date: Feb. 24, 2011

(65) Prior Publication Data
US 2012/0176410 A1    Jul. 12, 2012

(30) Foreign Application Priority Data
Aug. 18, 2009    (DE) .......................... 10 2009 037 835

(51) Int. Cl.
*G06G 5/00*     (2006.01)
*G06F 3/01*     (2006.01)
*G06T 15/20*    (2011.01)
*G06T 19/00*    (2011.01)

(52) U.S. Cl.
CPC ................ *G06F 3/011* (2013.01); *G06T 15/20* (2013.01); *G06T 19/00* (2013.01); *G06T 19/006* (2013.01)
USPC .......................................... 345/633; 345/632

(58) Field of Classification Search
CPC ..................................................... G06T 19/006
USPC .................................................. 345/632, 633
See application file for complete search history.

(56) References Cited

U.S. PATENT DOCUMENTS 5,379,215 A * 1/1995 Kruhoeffer et al. ................ 702/3
6,037,936 A * 3/2000 Ellenby et al. ................ 715/764
(Continued)

FOREIGN PATENT DOCUMENTS

KR       2009000186       1/2009

OTHER PUBLICATIONS

Mackinlay et al., Rapid Controlled Movement Through a Virtual 3D Workspace, Aug. 1990, ACM Computer Graphics, vol. 24, No. 4, pp. 171-176.*

(Continued)

*Primary Examiner* — M Good Johnson

(57) ABSTRACT

The invention relates to a method for ergonomically representing virtual information in a real environment, comprising the following steps: providing at least one view of a real environment and of a system setup for blending in virtual information for superimposing with the real environment in at least part of the view, the system setup comprising at least one display device, ascertaining a position and orientation of at least one part of the system setup relative to at least one component of the real environment, subdividing at least part of the view of the real environment into a plurality of regions comprising a first region and a second region, with objects of the real environment within the first region being placed closer to the system setup than objects of the real environment within the second region, and blending in at least one item of virtual information on the display device in at least part of the view of the real environment, considering the position and orientation of said at least one part of the system setup, wherein the virtual information is shown differently in the first region than in the second region with respect to the type of blending in in the view of the real environment.

28 Claims, 18 Drawing Sheets

(56) References Cited

U.S. PATENT DOCUMENTS

| | | | |
|---|---|---|---|
| 6,169,552 B1 * | 1/2001 | Endo et al. ............... | 345/427 |
| 6,243,054 B1 | 6/2001 | DeLuca | |
| 6,414,696 B1 * | 7/2002 | Ellenby et al. ............ | 715/762 |
| 6,559,813 B1 | 5/2003 | DeLuca et al. | |
| 6,885,939 B2 * | 4/2005 | Schmidt et al. ........... | 701/428 |
| 6,983,203 B1 * | 1/2006 | Wako ......................... | 701/533 |
| 7,023,536 B2 | 4/2006 | Zhang et al. | |
| 7,038,846 B2 | 5/2006 | Mandella | |
| 7,088,440 B2 | 8/2006 | Buermann et al. | |
| 7,110,100 B2 | 9/2006 | Buermann et al. | |
| 7,113,270 B2 | 9/2006 | Buermann et al. | |
| 7,161,664 B2 | 1/2007 | Buermann et al. | |
| 7,203,384 B2 | 4/2007 | Carl | |
| 7,268,956 B2 | 9/2007 | Mandella | |
| 7,295,220 B2 | 11/2007 | Zhou et al. | |
| 7,460,953 B2 * | 12/2008 | Herbst et al. ............. | 701/438 |
| 7,818,124 B2 * | 10/2010 | Herbst et al. ............. | 701/439 |
| 7,904,483 B2 * | 3/2011 | Koch et al. ............... | 707/802 |
| 7,913,192 B2 * | 3/2011 | Dicke et al. .............. | 715/864 |
| 7,941,269 B2 * | 5/2011 | Laumeyer et al. ......... | 701/523 |
| 8,040,361 B2 * | 10/2011 | Bachelder et al. ......... | 345/633 |
| 8,226,011 B2 | 7/2012 | Merkli et al. | |
| 8,339,399 B2 * | 12/2012 | Snow ......................... | 345/440 |
| 8,397,171 B2 * | 3/2013 | Klassen et al. ............ | 715/764 |
| 2005/0168437 A1 | 8/2005 | Carl et al. | |
| 2007/0242131 A1 | 10/2007 | Sanz-Pastor et al. | |
| 2009/0040370 A1 | 2/2009 | Varanasi | |
| 2009/0240431 A1 * | 9/2009 | Chau et al. ................ | 701/208 |
| 2009/0319348 A1 * | 12/2009 | Khosravy et al. .......... | 705/14.1 |
| 2010/0035637 A1 * | 2/2010 | Varanasi et al. ........... | 455/457 |
| 2010/0214111 A1 | 8/2010 | Schuler et al. | |
| 2011/0227915 A1 | 9/2011 | Mandella et al. | |
| 2012/0038549 A1 | 2/2012 | Mandella et al. | |
| 2013/0093787 A1 * | 4/2013 | Fulks et al. ............... | 345/629 |
| 2013/0194418 A1 | 8/2013 | Gonzalez-Banos et al. | |

OTHER PUBLICATIONS

Chittaro, Visualizing Information on Mobile Devices, IEEE Computer Society, Mar. 2006, pp. 40-45.*

Shibata et al. "A View Management Method for Mobile Mixed Reality Systems", Dec. 31, 2008, http://www.mclab.ics.ritsumei.ac.jp/pdf/paper-final2.pdf.

Julier et al. "Information Filtering for Mobile Augmented Reality", Augmented Reality, 2000, pp. 3-11.

A. Kameka, "Layar Android App Augments Reality with POI's and More", Jun. 16, 1009, http://androinica.com/2009/06/layar-android-app-augments-reality-with-pois-and-more/.

Heinrich et al. "An Augmented Reality Weather System", Proceedings of the 2008 International Conference in Advances on Computer Entertainment Technology, Jan. 1, 2008, pp. 170.

Bell et al. "View Management for Virtual and Augmented Reality", Proceedings of the 14th ACM Symposium on User Interface Software and Technology, Jan. 20, 2001, pp. 101-110.

AR Wikitude. http://www.wikitude.com/en.

Enkin. http://www.enkin.net.

Feiner et al. "A Touring Machine: Prototyping 3d Mobile Augmented Reality Systems for Exploring the Urban Environment", Proceedings of the 1st International Symposium on Wearable Computers, 2001, pp. 74-81.

Gabbard et al. "Active Text Drawing Styles for Outdoor Augmented Reality: A User-Based Study and Design Implications", Proceedings of the IEEE Virtual Reality Conference, 2007, pp. 35-42.

T. Hollerer, "Uder Interfaces for Mobile Augmented Reality Systems", Graudate School of Arts and Sciences of Columbia University, 2004.

Reitmayr et al. "Collaborative Augmented Reality for Outdoor Navigation and Information Browsing", Proceedings of the Symposium Location-Based Services and Telecartography, 2004, pp. 31-41.

J. Rekimoto, "The Magnifying Glass Approach to Augmented Reality Systems", Proceedings of the International Conference on Artificial Reality and Tele-Existence and Conference on Virtual Reality Software and Technology, 1995, pp. 123-132.

Sekai Camer. http://www.tonchidot.com.

Wither et al. "Evaluating Display Types for AR Selection and Annotation", IEEE International Symposium on Mixed and Augmented Reality, 2007.

Wither et al. "Pictorial Depth Cues for Outdoor Augmented Reality", Proceedings of the 9th IEEE International Symposium on Wearable Computers, 2005, pp. 92-99.

Hautiere et al. "Automatic Fog Detection and Estimation of Visibility Distance Through Use of an Onboard Camera", Journal Machine Vision and Applications, Apr. 2006, vol. 17, No. 1, pp. 8-20.

Henrich et al. "AR Weather", Mixed and Augmented Reality, 2008, pp. 187-188.

http://www.layar.com.

Offering Pioneering Patents: Stereoscopic User Interface and Augmented Reality Headset Mike DeLuca.

Chinese office action for CN101080036494.9 dated Oct. 14, 2013.

* cited by examiner

US 8,896,629 B2

METHOD FOR REPRESENTING VIRTUAL INFORMATION IN A REAL ENVIRONMENT

This application is entitled to the benefit of, and incorporates by reference essential subject matter disclosed in PCT Application No. PCT/EP2010/061841 filed on Aug. 13, 2010, which claims priority to German Application No. 10 2009 037 835.9 filed Aug. 18, 2009.

BACKGROUND OF THE INVENTION

1. Technical Field

The present invention relates to a method for representing virtual information in a real environment. The method is particularly suitable for ergonomic representation and marking of points of interest in the world by means of augmented reality technology.

2. Background Information

Augmented Reality (AR) is a technology in which virtual data are overlaid with reality and which thus facilitates the association of data with reality. The use of mobile AR systems is already known in the prior art. In the past years, high-performance mobile devices (e.g. smartphones) turned out to be suitable for AR application. These devices meanwhile have comparatively large color displays, installed cameras, good processors and additional sensors, such as e.g. orientation sensors and GPS. In addition thereto, the position of the device can be approximated via radio networks.

In the past, there were various projects implemented on mobile devices using AR. At first, there were used special optical marks for ascertaining the position and orientation of the device. As regards AR, which is usable for large areas as well and thus is also referred to as large area AR, there have also been published hints for sensible representation of objects in connection with HMDs [2,4,5,6,7,8,9]. In more recent times, there are also approaches to utilize GPS and the orientation sensor systems of modern devices [1,3,10,15].

Especially as regards these approaches using video see-through AR on small mobile devices, however, there have been no innovative methods published for enhancing usability and user friendliness of the same, respectively.

The applicant has arrived at the finding that certain system properties should be fulfilled for using large-area AR: (1) Uncomplicated, rapid use and direct access to relevant information. (2) The accuracy of associating virtual information with reality is important. (3) The user interface should be clean and tidy.

Disadvantage of methods used so far: (1) There is often used a so-called "birdview" (a kind of bird's eye perspective) as overview on points in the surrounding environment. This view is used e.g. to show to the user, by blended in virtual information, where approximately points of interest are located in the real world. With a limited screen size, the user has a limited view of remote elements, or in other words the resolution becomes too small and the elements are not distinguishable/visible. The interface is rendered more complex by the simultaneous representation of two viewing directions. (2) If the size of the objects is not scaled properly, the users' distance perception and thus the capability of association will be impaired. (3) If the size of the objects is scaled, these become small and illegible with large distances. The interface has an unclean and untidy appearance.

SUMMARY OF THE INVENTION

It is the object of the invention to indicate a method for representing virtual information in a real environment, which is capable of achieving an ergonomic representation of points of interest in the real world without excessively restricting the user's field of view and without overstraining the user with an excess of information.

A first aspect of the invention relates to a method for representing virtual information in a real environment, comprising the following steps: providing at least one view of a real environment and of a system setup for blending in or overlaying virtual information for superimposing with the real environment in at least part of the view, the system setup comprising at least one display device, determining a position and orientation of at least one part of the system setup relative to at least one component of the real environment, subdividing at least part of the view of the real environment into a plurality of regions comprising a first region and a second region, with objects of the real environment within the first region being placed closer to the system setup than objects of the real environment within the second region, blending in or overlaying at least one item of virtual information on the display device in at least part of the view of the real environment, considering the position and orientation of said at least one part of the system setup, wherein the virtual information is shown differently in the first region than in the second region with respect to the type of blending in or overlay in the view of the real environment.

The at least one part of the system setup may be a camera, for example, the position and orientation (pose) of which are determined, with the camera being not necessarily fixedly connected to the display device. In specific cases, there is no camera necessary at all for the overall system, e.g. when the pose of at least one part of the system setup is determined via GPS and orientation sensors only. The pose determination of any part of the system setup is suitable as a matter of principle, provided there are conclusions possible as to the viewing direction of the user.

The first region can be a near region, whereas the second region can be a far or remote region, for example. However, it is also possible that the first region represents a location region, whereas the second region represents a near region. An embodiment with near region, far region and location region will be elucidated in more detail hereinafter with reference to the drawings.

In accordance with another aspect of the invention which can also be applied separately from the above first aspect of the invention involving the subdivision of the view into regions, it is also possible in blending in virtual information in a view of a real environment to consider weather data that are queried e.g. via the Internet ("online") so as to enhance the degree of reality of blended in virtual information with respect to the real environment and to thus improve the association therewith. There are various degrees of complexity conceivable for processing. For example, e.g. on the basis of the weather situation, there may be assigned fixed illumination models or materials (e.g. textures) matching the weather situation. In addition or as an alternative, there can be calculated shadows cast or light conditions in accordance with weather data (such as e.g. clouds, solar radiation etc.) and/or other data (such as time of the day, time of the year etc.).

In an embodiment, the at least one item of virtual information represents a point of interest (generally also abbreviated as POI, especially in connection with navigation devices) with respect to the real environment.

The invention offers the advantage that an ergonomic representation of virtual information, in particular of points of interest, in the real world is obtained without the field of view of the user being excessively restricted and without overstraining the user with too many items of information. At the same time, there can be displayed many different items of virtual information which, however, due to the ergonomic representation of the virtual information, does not result in overstraining the user. Moreover, the association of information can be enhanced by consideration of the human perception mechanisms.

Further advantageous developments of the invention can be taken from the dependent claims.

BRIEF DESCRIPTION OF THE DRAWINGS

The invention will now be elucidated in more detail by way of the figures shown in the drawings, in which

FIG. 2) of the location region, as exemplified in the view according to FIG. 4.

DETAILED DESCRIPTION OF THE INVENTION

Figure 1:
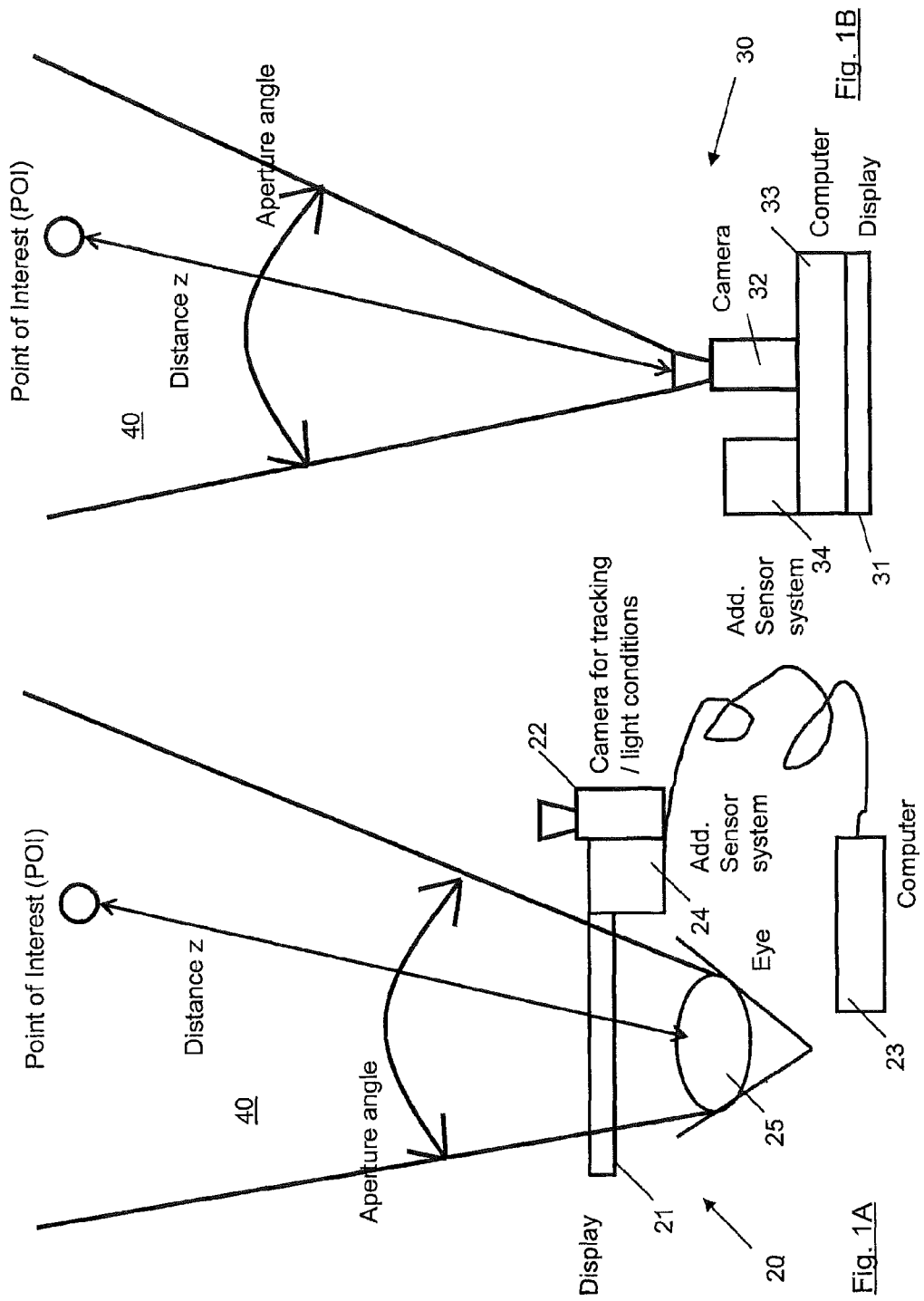
FIG. 1 shows a plan view of a schematic arrangement of exemplary system setups with respect to a real environment that can be used for performing a method according to the invention.

FIG. 1 shows a plan view illustrating a schematic arrangement of exemplary system setups with respect to a real environment, which can be used for performing a method according to the invention. In particular, FIG. 1 illustrates various possibilities of a system setup.

In the illustration of FIG. 1A, the user wears, as display device, a head mounted display system (abbreviated to HMD) comprising a display 21 that is part of the system setup 20. The display 21 e.g. may be generally known semi-transparent data glasses ("optical see-through display") in which virtual information provided by a computer 23 can be blended in. The user then sees through the semi-permeable data glasses 21, in a view of the real world 40, objects of the real world augmented with blended in virtual information (such as e.g. POI objects related to the real world). In this manner, the system setup 20 constitutes an embodiment of a generally known Augmented Reality (AR) system.

The display 21 may have additional sensors 24, such as rotation sensors, and a camera 22 for optical tracking mounted thereon. Display 21 can be semi-transparent or may be fed with images of the reality by a camera image. With a semi-transparent display 21, calibration between eye 25 and display 21 is necessary. To this end, there are various methods documented in the prior art and known to the expert. Advantageously on display 21 or anywhere on the user's body or in computer unit 23, there may also be installed position sensors, such as e.g. GPS sensors (GPS: Global Positioning System) for rendering possible geographic position determination of the system setup 20 (e.g. in accordance with longitude and latitude) in the real world 40.

In the illustration of FIG. 1B, there is shown another exemplary system setup 30 that can be found often e.g. in modern mobile telephones (so-called "smartphones"). The display device 31 (e.g. in the form of a display screen or display), computer 33, sensors 34 and camera 32 constitute a system unit that is accommodated e.g. in a common housing of a mobile telephone. The view of the real environment 40 is provided by display 31 showing a camera image of the real environment 40 captured by camera 32. For augmented reality applications, the camera image can be shown on display 31 and augmented with additional virtual information (such as POI objects related to the real world). In this manner, the system setup 30 constitutes another embodiment of a generally known augmented reality (AR) system.

Basically, the present invention can be used expediently for all forms of AR. For example, it is of no relevance whether the representation is implemented in the so-called optical see-through mode with semi-transparent HMD or in the video see-through mode with camera and display screen. When reference is made hereinafter to the camera, this may be a camera or the optical system resulting from the combination of eye and see-through display (cp. display 21 of FIG. 1A). Both thereof comprise relevant camera properties for blending in virtual information, such as aperture angle and main point of image).

The invention basically can also be used in connection with stereoscopic displays, in which the video see-through approach advantageously uses two cameras each for recording one video stream per eye. In any situation, the items of virtual 3D information can be calculated individually for each eye.

The processing of the different partial steps described hereinafter basically can be distributed to various computers via a network. Thus, a client/sever architecture or a pure client-based solution is possible. For example, the client could send an image to a server which, on the basis of the image, makes available to the client information on the 3D position and 3D orientation of the system setup (cp. FIG. 1) or part thereof in relation to the real world (referred to as pose in the following) and on the range of vision. Moreover, the client or the server may also comprise several computing units, such as several CPUs or specialized hardware components, such as generally known FPGAs, ASICs, GPUs or DSPs. Several clients may also exchange information among each other which e.g. is generated with respect to the range of vision at this location, or in case a client generates a POI. This exchange of information can take place via a server, however, direct connections via Bluetooth or WLAN would be conceivable as well.

For permitting AR to be realized, the pose (position and orientation) of the camera in space is necessary. This can be realized in variety of different ways. It is possible to determine the pose in the world e.g. by using merely GPS and an orientation sensor with electronic compass (as installed e.g. in some modern mobile telephones). However, the uncertainty of the pose then is very high. Thus, it is also possible to use other methods, such as e.g. optical initialization and tracking or the combination of optical methods using GPS and orientation sensors. WLAN locating can be used as well or RFIDs or optical markers can support the locating process. As mentioned hereinbefore. a client/server-based approach is possible here as well. In particular, the client can request from the server location-specific information needed for optical tracking. Such information may be e.g. reference images of the surrounding environment with pose information and depth information.

The invention can improve the information representation for the client. However, it can also be utilized in a remote scenario (remote view scenario). In this scenario, e.g. a maintenance expert in a control room views the client's image transferred via the data network as well as the correspondingly processed items of information on his display screen. The expert then could give instructions to the client or just observe. In a similar scenario it is conceivable that a person views recorded image or video material along with interactive additional information represented according to the invention, and, if possible, can navigate through the material similar to the Internet-based application "Google Streetview".

In addition thereto, the invention can also be installed, or carried along, in vehicles, aircraft or ships as a monitor, HMD or by way of a head-up display.

Basically, a point of interest ("POI") can be set up for a large variety of different forms of information. Examples are given hereinafter. It is possible to represent images of places using GPS information. It is possible to automatically extract information from the Internet. For example, this may be company or restaurant websites with addresses or pages giving ratings. Users can deposit texts, images or 3D objects at locations and make the same available to others. Information pages, such as Wikipedia, can be searched for geo-information, and the pages can be made accessible as POI. POIs can be generated automatically from the search and browsing behavior of the users of mobile devices. It is possible to show other locations of interest, such as underground transportation or bus stations, hospitals, police stations, physicians, real estate ads or fitness clubs.

In the following, aspects and embodiments of the invention will be explained in more detail by way of the flowcharts shown beginning with FIG. 12 in conjunction with the remaining FIGS. 1 to 11.

Figure 2:
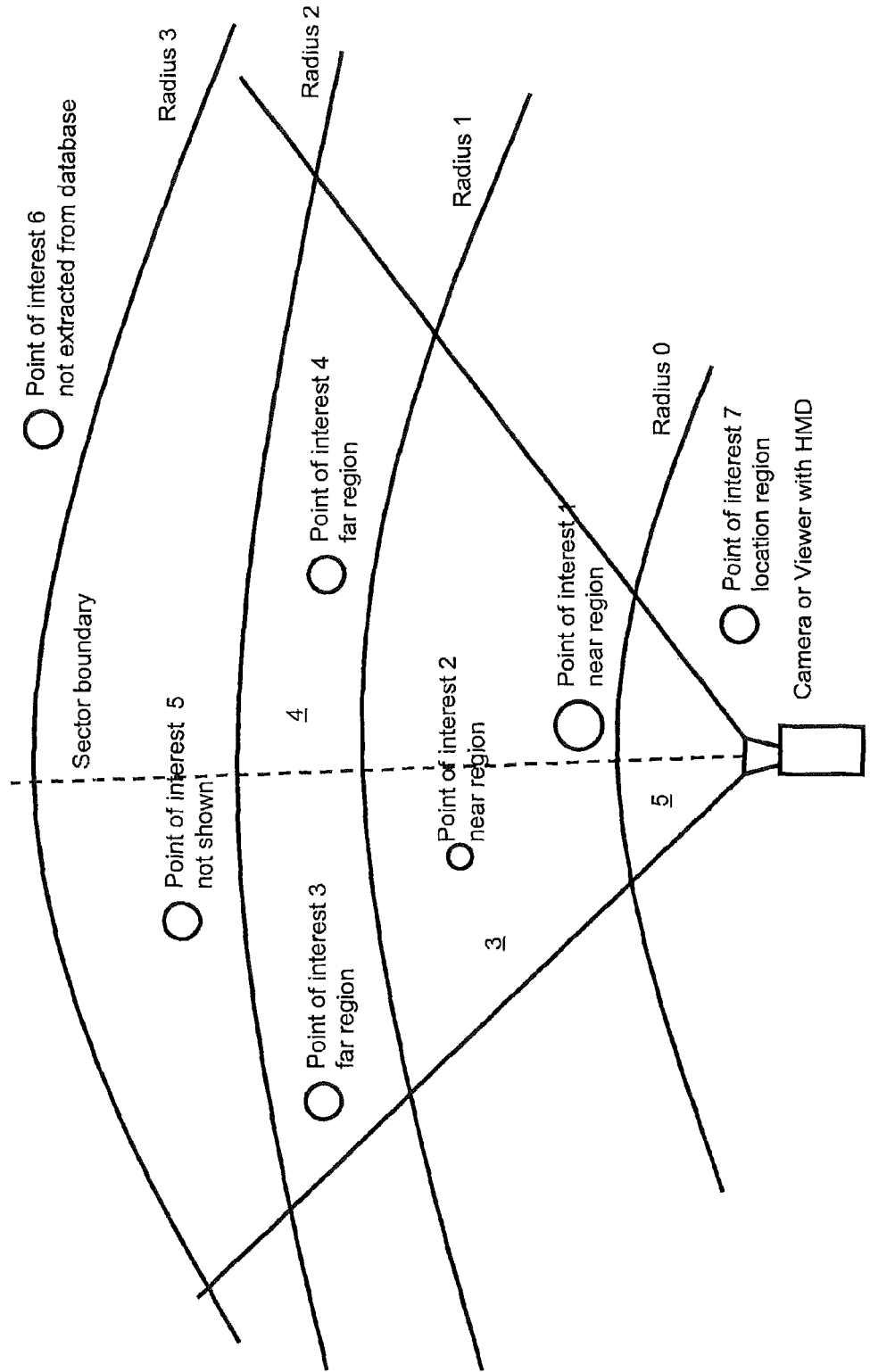
FIG. 2 shows a schematic arrangement of an exemplary division of points of interest (surrounding POIs) to different radius regions.
Figure 3:
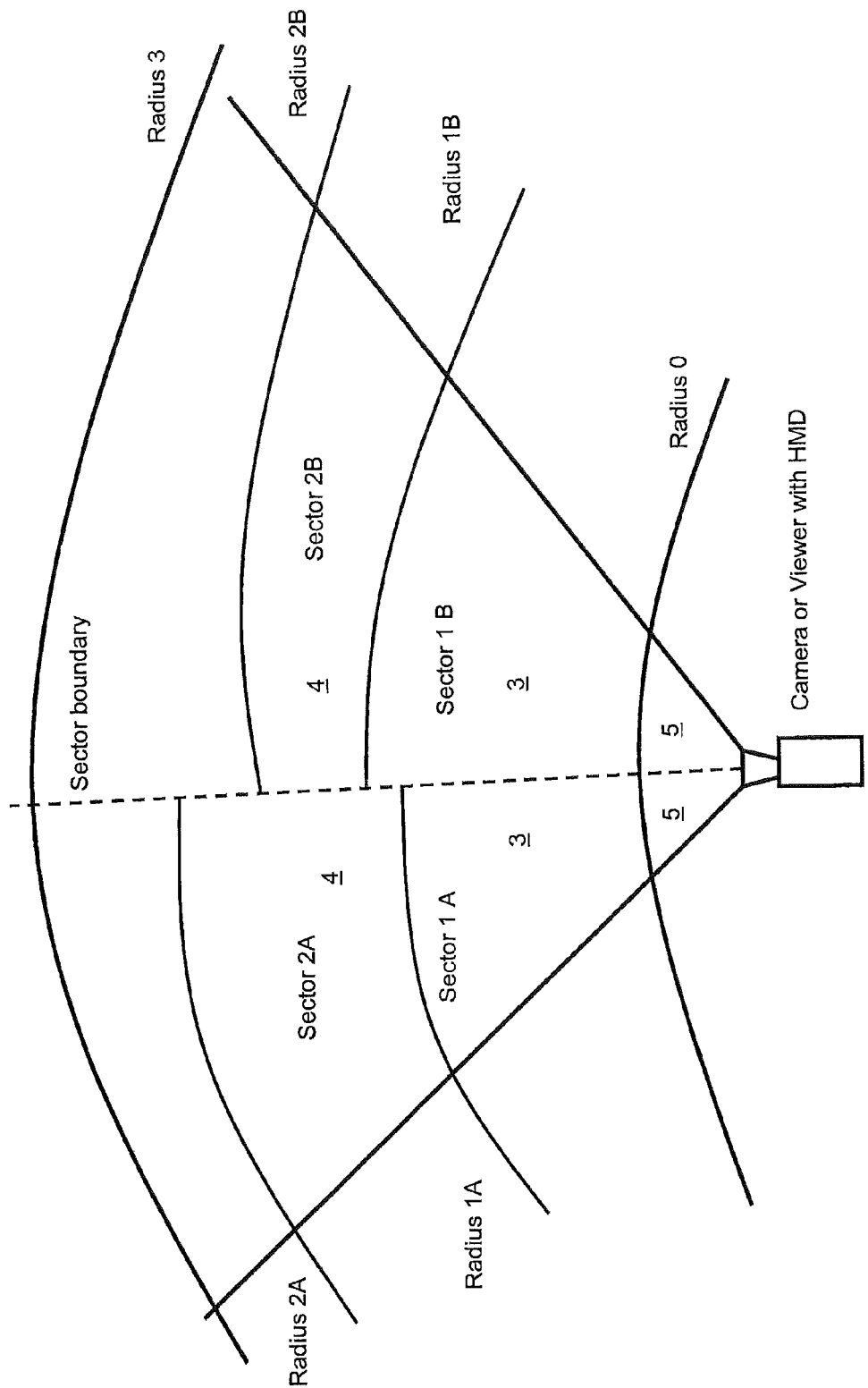
FIG. 3 shows a schematic arrangement illustrating a possible approach for calculating the radii over POIs in sections, in which the radii per sector may differ from each other.
Figure 4:
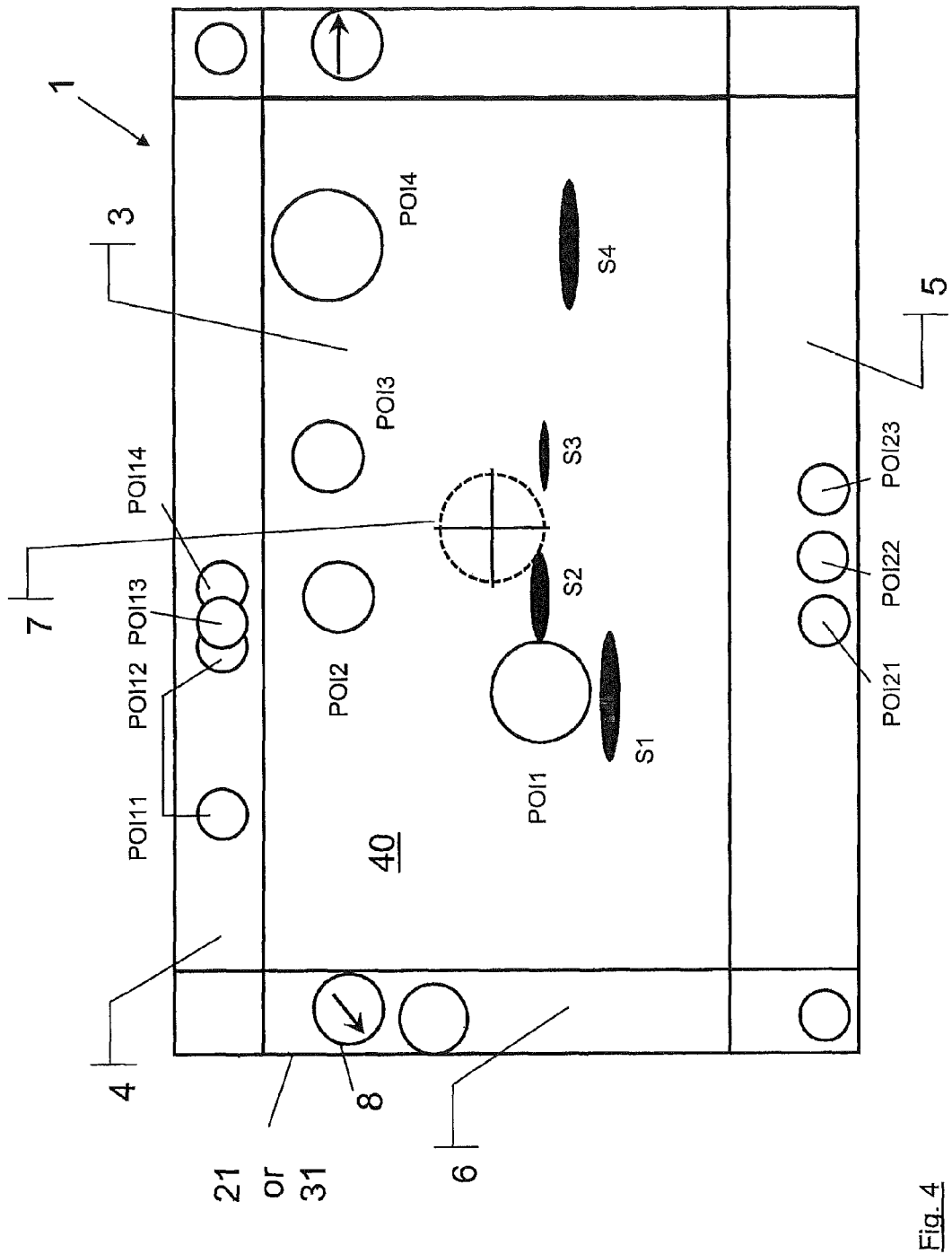
FIG. 4 shows possible elements of an exemplary view of the real environment with blended in virtual information (here: POI objects) for forming an embodiment of a user interface according to aspects of the invention.

In this regard, FIG. 2 shows a schematic arrangement illustrating an exemplary division of points of interests (surrounding POIs) to different radii regions, FIG. 3 shows a schematic arrangement illustrating a possible approach for calculating the radii over POIs in sectors, with the possibility that the radii per sector may be different, and FIG. 4 shows possible elements of an exemplary view of the real environment with blended in items of virtual information (here: POI objects) for creating an embodiment of a user interface in accordance with aspects of the invention.

As illustrated in more detail in FIG. 4, at least a part of the view 1 of the real environment (which may be the view through a semi-transparent HMD 21 or on a screen HMD 21 according to FIG. 1A or a screen view of a camera image on display 31 according to FIG. 1B) is subdivided into a plurality of regions. In the present embodiment, these regions comprise a first region 3, constituting a near region 3 in the present embodiment, a second region 4, constituting a far region 4 in the present embodiment, and a third region 5 constituting a location region 5 in the present embodiment. Objects of the real environment 40, within near region 3, are placed closer to the system setup 20 and 30, respectively, than objects of the real environment within far region 4. In the location region 5, in turn, objects of the real environment 40 are placed closer to system setup 20 and 30, respectively, than objects of the real environment within near region 3.

The view 1 according to FIG. 4 has at least one item of virtual information blended in (in the present embodiment, several items of virtual information POI1-POI4, POI11-POI14 and P0I21-POI23 are blended in). In the present embodiment these represent points of interest (POIs) in relation to the reality that can be seen in view 1. For, example virtual information POI1 is blended in relating to a building visible in view 1 (not shown in FIG. 4) that makes reference to this building and/or is optically associated with the same and possibly permits additional information to be retrieved with respect to the building. The information POI1 is blended in on the display device 21 and 31, respectively, in at least part of the view 1 of the real environment, considering the position and orientation of the corresponding system setup 20 or 30 or part thereof, respectively. As will still be explained in more detail hereinafter, the blended in virtual information is shown differently in the near region 3 than in the far region 4, with respect to type of blending in in view 1. In other words, the same virtual information (e.g. POI1) in the near region 3, e.g. when it is associated with a real object in the near region 3, is shown differently from its blending in in the far region 4, e.g. when it is associated with a real object in the far region 4 (a POI is present here at the same time in one region only).

As illustrated in FIGS. 2 and 3, the near region 3 is separated from the far region 4 and the location region 5 by a respective boundary which in the present embodiment each have a radius (radius 0 to radius 3) in the direction of a viewing angle of the display device (FIG. 2 in addition shows further boundaries or radii, as will still be explained in more detail hereinafter). The determination and calculation of the radii according to FIGS. 2 and 3 will still be described in more detail in the following. The boundaries do not have a fixed shape, but preferably are rotation-symmetric with respect to the camera and viewer, respectively. The boundaries in addition do not need to be circular, but may also have an e.g. elliptical or other shape.

Overview

Figure 10:
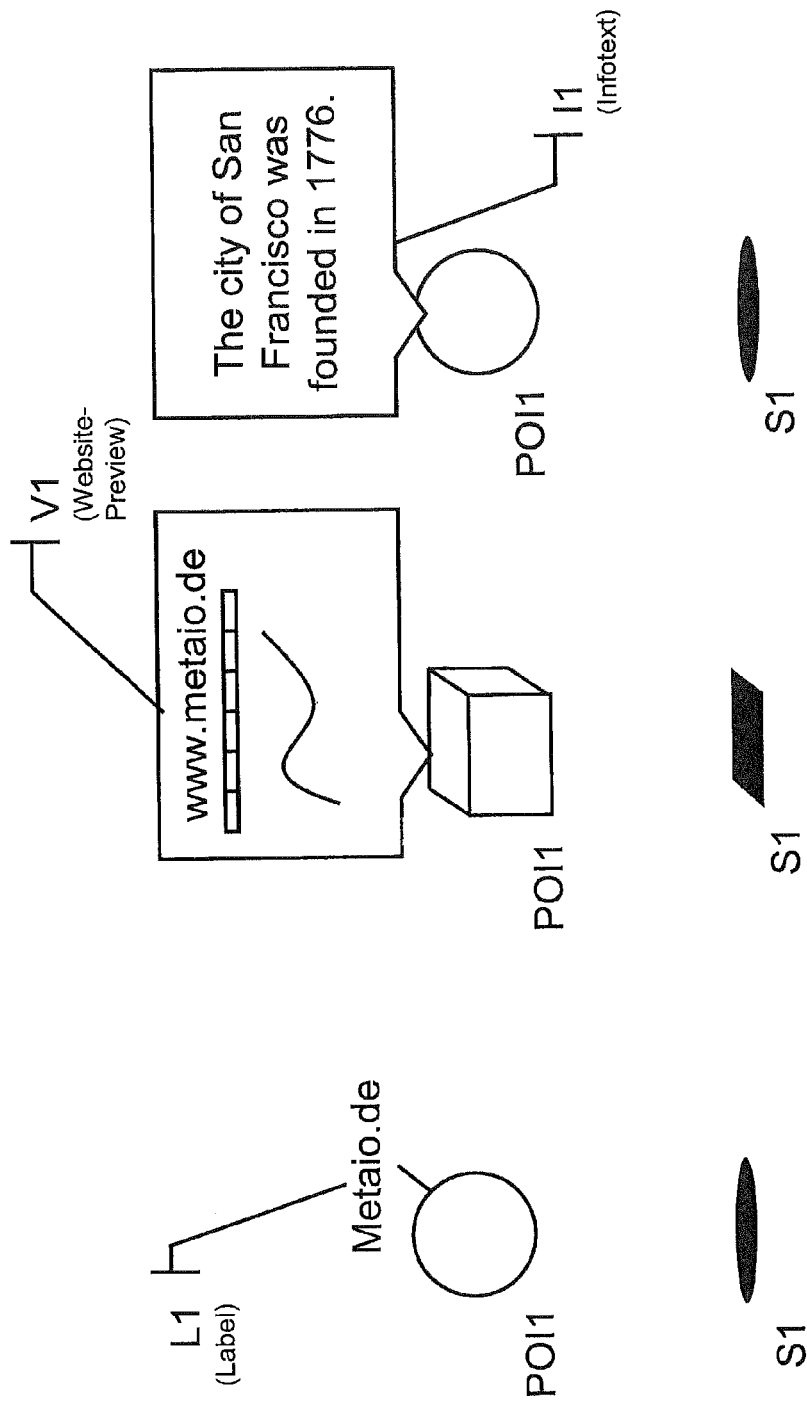
Figure 11:
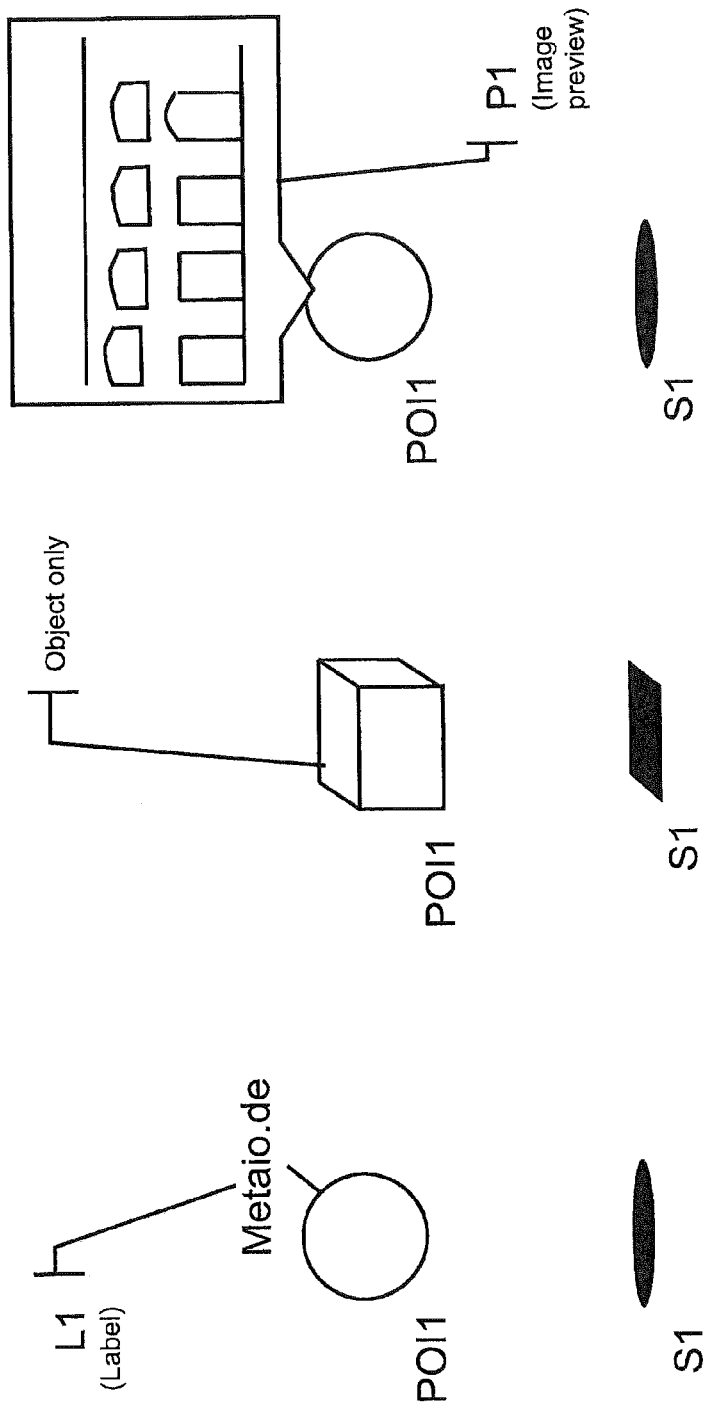
Figure 12:
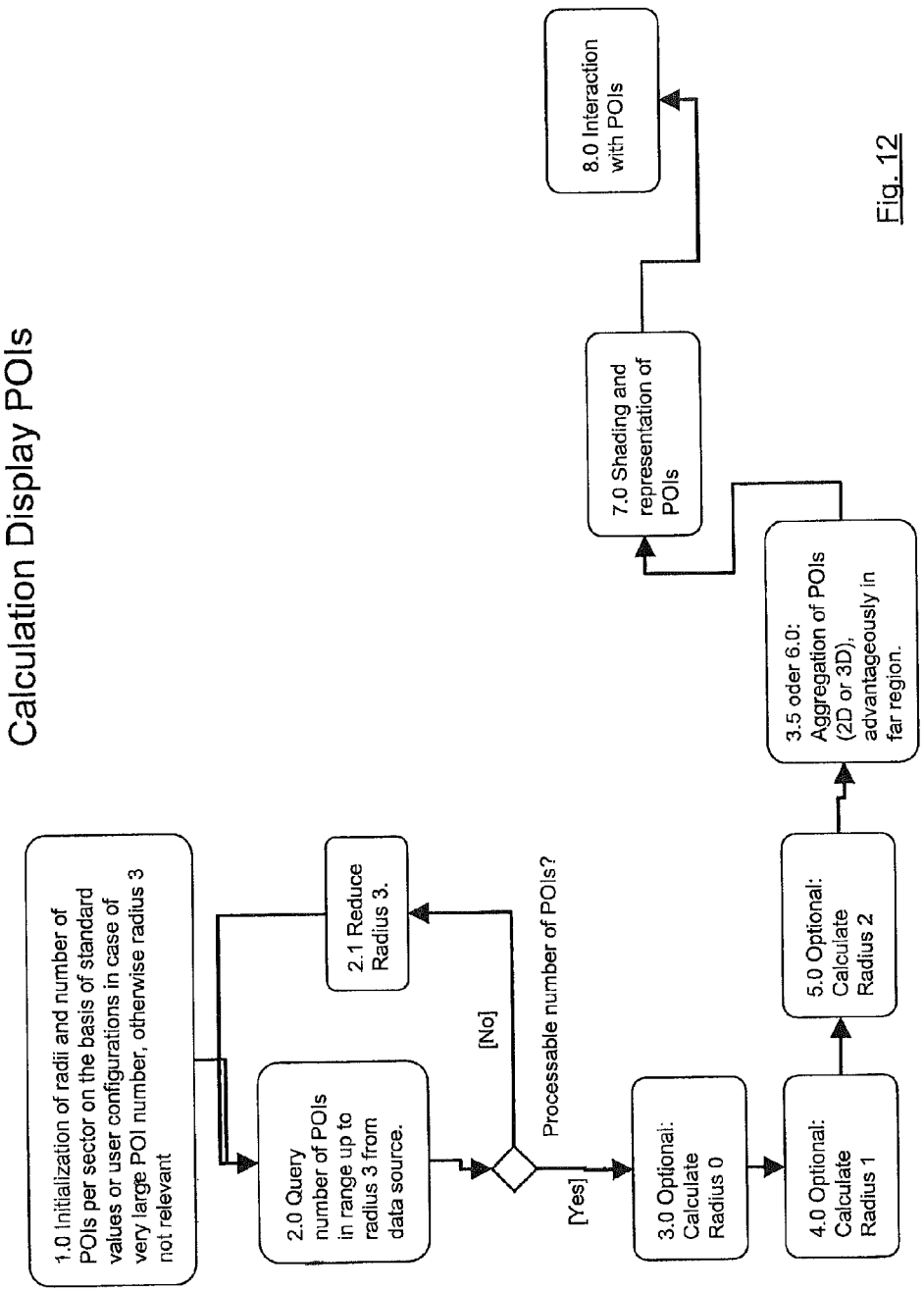
FIG. 12 shows a flowchart giving an overview of the overall process of an embodiment of a method according to the invention.

FIG. 12 shows in a flowchart an overview of the process of an embodiment of a method according to the invention in conjunction with FIGS. 1 to 11. In a first step 1.0, the system is initialized or, in case a pass has already taken place, prior values can be retained optionally. In a subsequent step, data are loaded if the same are not yet present or if the situation has changed. The data source may be contained in more or more servers or can be stored locally on the device or can be coded as information in the environment (e.g. via RFID or QR codes). In case a very large number of POIs is deposited in the data source, the number can be restricted via the position and the determination of a radius 3. Such functionality is offered e.g. by modern database systems with spatial features or properties. Basically, POIs may already be filtered out in this step as well by way of filters defined by the user himself. For example, gastronomy only or no gastronomy. POIs carrying corresponding information are sorted out then. It is apparent to the expert here that a corresponding data structure can be deposited for a POI, which may contain e.g. its position, its 2D or 3D shape, an image and/or additional meta information, such as e.g. the category.

In steps 3.0-6.0 the POIs then are organized according to the invention. Thereafter, they can be processed optically and displayed. Following this, interaction with the POIs shown is possible, as will be explained in more detail by way of an example.

Division Into Regions

In the following, steps 3.0-6.0 of FIG. 12 will be described in more detail in conjunction with subsequent FIGS. 13 to 18 and FIGS. 1 to 11. In this regard, FIGS. 13 to 18 relate to possible sub-steps of the general method steps illustrated in FIG. 12. These steps basically can be implemented per pass or in the background, in certain intervals, depending on the capacity of the system. A fundamental aspect of the invention consists in that items of blended in virtual information (here: POIs) will be assigned to fixedly configured or automatically calculated, different regions of a view of the real world.

Figure 13:
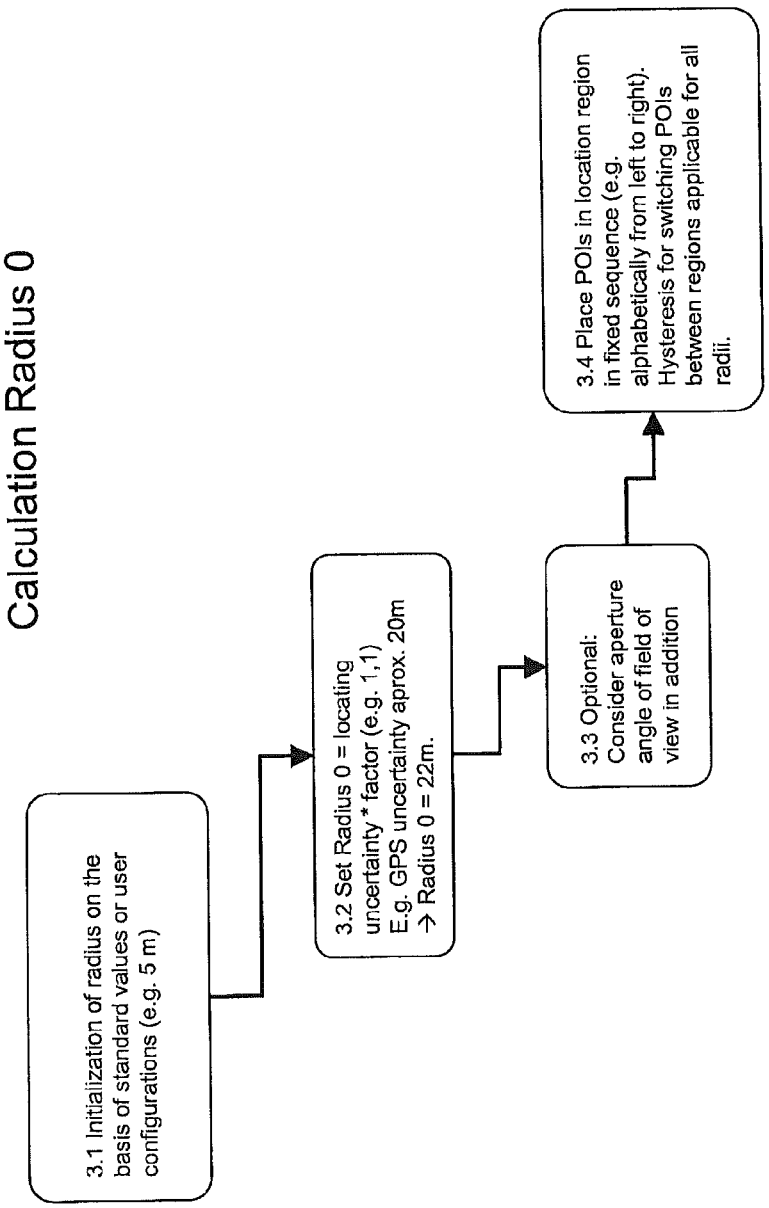
FIG. 13 shows an embodiment illustrating a possible course for calculating radius 0 (cp.

FIG. 2 shows a view of a possible scenario from a bird's eye perspective. Various POIs are shown in a spatial arrangement in the surroundings of the camera. If all of these POIs were simply displayed, the screen rapidly would be overfilled with numerous objects. For this reason, a subdivision is made to different regions. The location region 5 is confined by radius 0. As regards the radii, it is to be noted that they are not necessarily constant over all angles, but may vary in accordance with the angle (cp. FIG. 3). The location region 5 shows objects located in close proximity, so that it is difficult for the user to find the same with the device. The possibility of finding them is dependent in particular on the accuracy of the ascertainable pose. Accordingly, radius 0 may be set greater or smaller advantageously in accordance with the (uncertainty of the) pose determination (FIG. 13).

Figure 6:
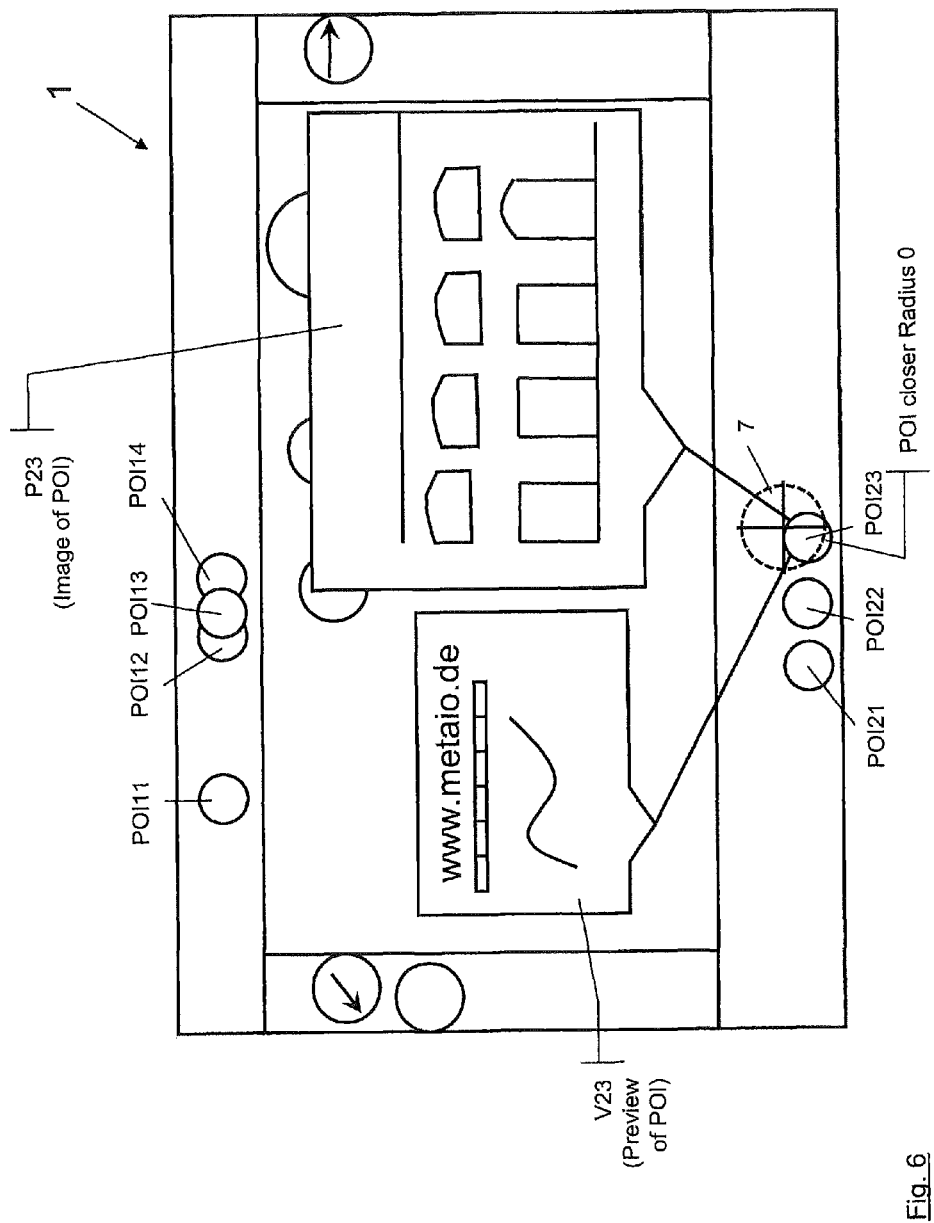
FIG. 6 shows an exemplary preview for virtual information (here: POI) in the location region of the view according to FIG. 4.

FIG. 4 shows possible elements of an exemplary view of the real environment with blended in virtual information (here: POI objects) for forming an embodiment of a user interface according to aspects of the invention. FIG. 4 in this regard shows an advantageous subdivision of the user interface. POIs in the location region 5 are fixedly arranged in the lower portion of view 1 and can be selected e.g. by mouse click or touching in the event of a touchscreen. FIG. 6 shows a possible view as a result of activation of an exemplary POI23. If provided, an image P23 of the exact location of POI23 can be displayed for orientation. If provided, a preview V23 of the deposited information can be displayed in addition.

POI objects present outside the location region 5, but in near sight, are arranged in near region 3. In this region, the correct association of virtual information with reality is deemed to be particularly important. For example, it may be relevant to the personal planning of the path whether a POI object is present before or behind a road crossing. Near region 3 is confined by radii 0 and 1 (FIG. 2).

Figure 14:
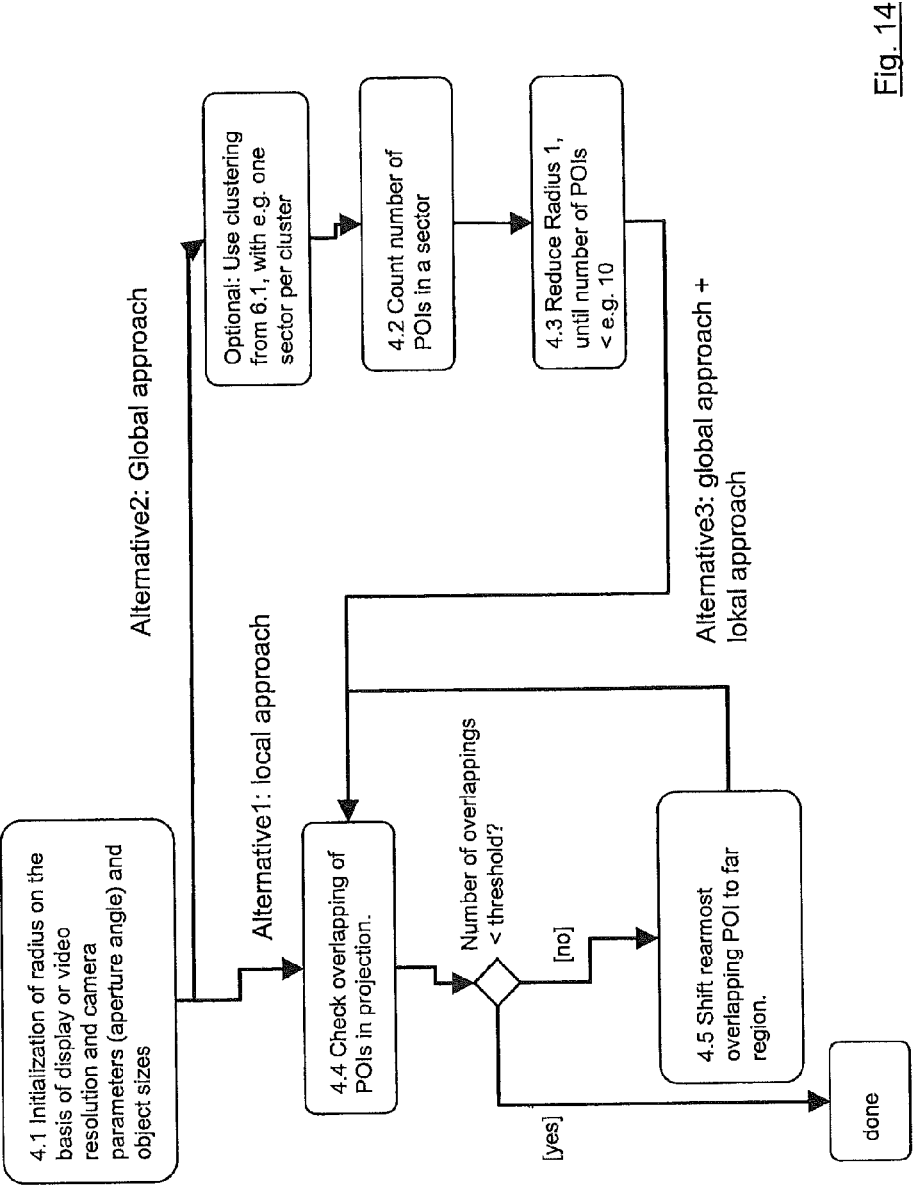
FIG. 14 shows an embodiment illustrating a possible course for calculating radius 1 as exemplified in FIG. 2.

FIG. 14 illustrates a possibility for calculating radius 1. On the one hand, the expedient visibility of POI objects is of relevance. If the representation of a POI still would have a size of 2 mm only (exemplary value), it would not be of much use, but cause just disorder on the display. The calculation in step 4.1 thus incorporates the resolution of the display, the size of the POI (the representation e.g. of a dinosaur permits a larger radius 1 than the representation of a sphere with a size of 1 m) and the aperture angle of the camera. In the following steps, radius 1 can be matched further if there are too many POIs filling the screen (referred to as global approach). The calculation can refer to the entire aperture angle of the camera or an even larger range. Smaller sectors can be adjusted individually as well.

Figure 16:
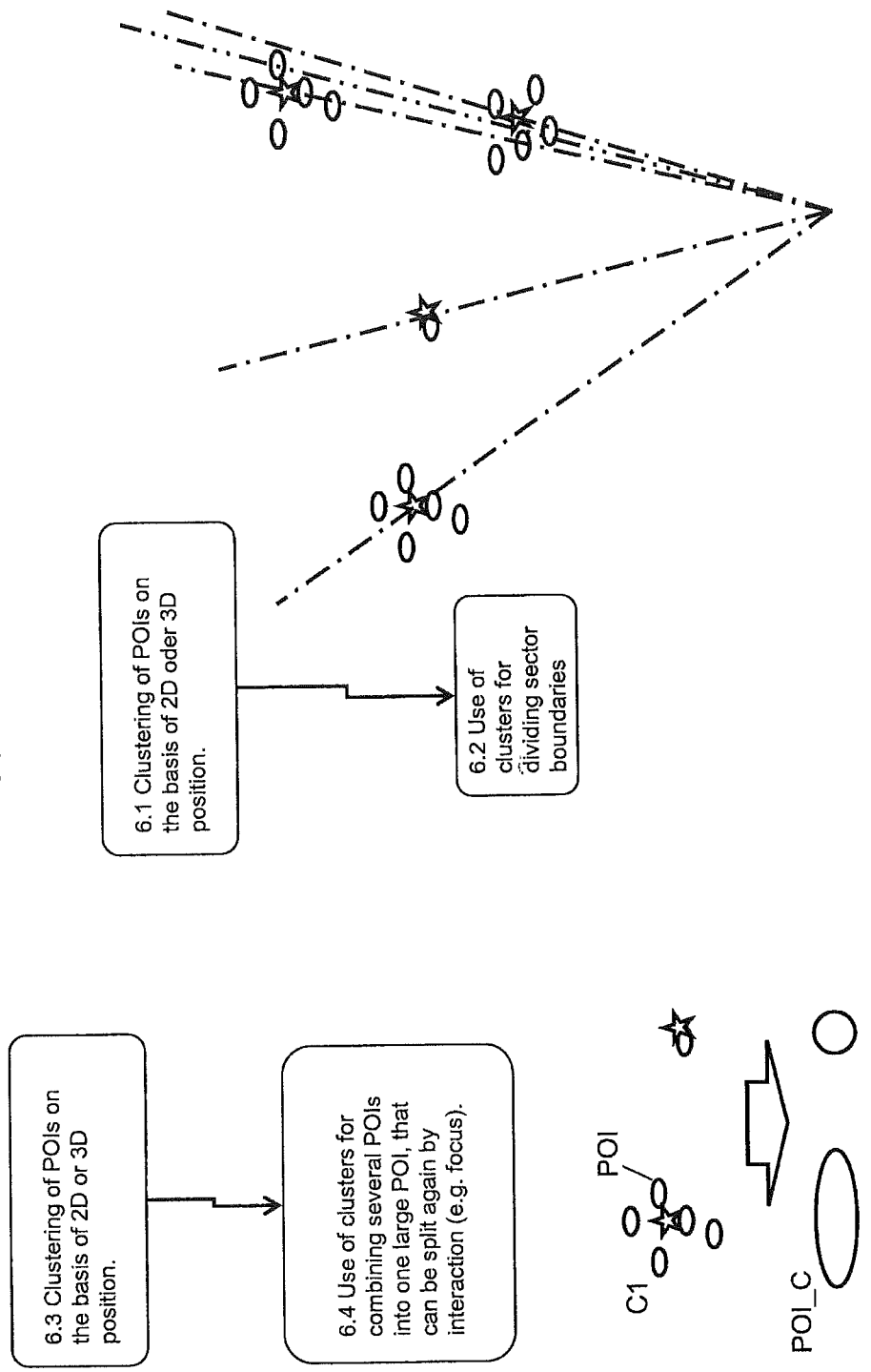
FIG. 16 shows a schematic view for illustrating exemplary possibilities for the aggregation of items of virtual information (here: POI objects).

The sectors may be fixed, for example, or can be formed on the basis of clusters, with clusters being of assistance to divide sectors (cp. step 6.2 in FIG. 16). An exemplary method could be implemented as follows: the center of gravity is calculated for each cluster. A straight line is drawn through this center. Straight lines arranged at a small angle from each other are combined. Each resulting straight line is aligned with integral angles, and a sector is assigned to the same. The size of the sectors then is rounded an increased iteratively in integral angle steps until contact is established with a neighboring sector. When the sectors are defined by clusters or by fixed settings, the number of POIs of a sector is counted in step 4.2. If the number exceeds a specific configurable threshold value, the radius is reduced until the value is below the threshold value (step 4.3).

As an alternative, it is also possible to shift individual POIs without radius matching to the far region 4 (referred to as local approach) if there are POIs overlapping in the representation. To this end, in step 4.4, the 2D position and extension of the POIs, in accordance with the rendering pipeline, is calculated. The rendering pipeline is understood by the expert as the projection of objects in 3D space to a smaller-dimension display. In the near region, this is effected e.g. in accordance with position, orientation, camera aperture angle and resolution of the 2D display portion available for the near region. For the far region, the rendering pipeline performs projection to a line. This can be effected e.g. using a standard 3D-2D projection in which the objects are communicated for the renderer as being very far away, in order to determine the position of the objects on the possibly rotated display in the vanishing point of the same. In case of overlapping, the rear POI is marked for the far region 4 (step 4.5). This marking may be retained for one display pass (step 1.0 to 9.0 of FIG. 12) or longer (e.g. 3 second or 5 display passes). The system can perform steps 4.4 and 4.5 until there are no more overlappings present or these are below a specific value. There may also be a tolerance as to when overlapping is rated as such (e.g. more than 10% of the sum of the area of both objects intersecting each other). Advantageously, it is also possible to combine the global approach with the local approach.

Although the drawings, for reasons of visibility, illustrate the sectors and POIs from a bird's eye perspective, all of these methods can be applied selectively for 3D application as well.

Figure 15:
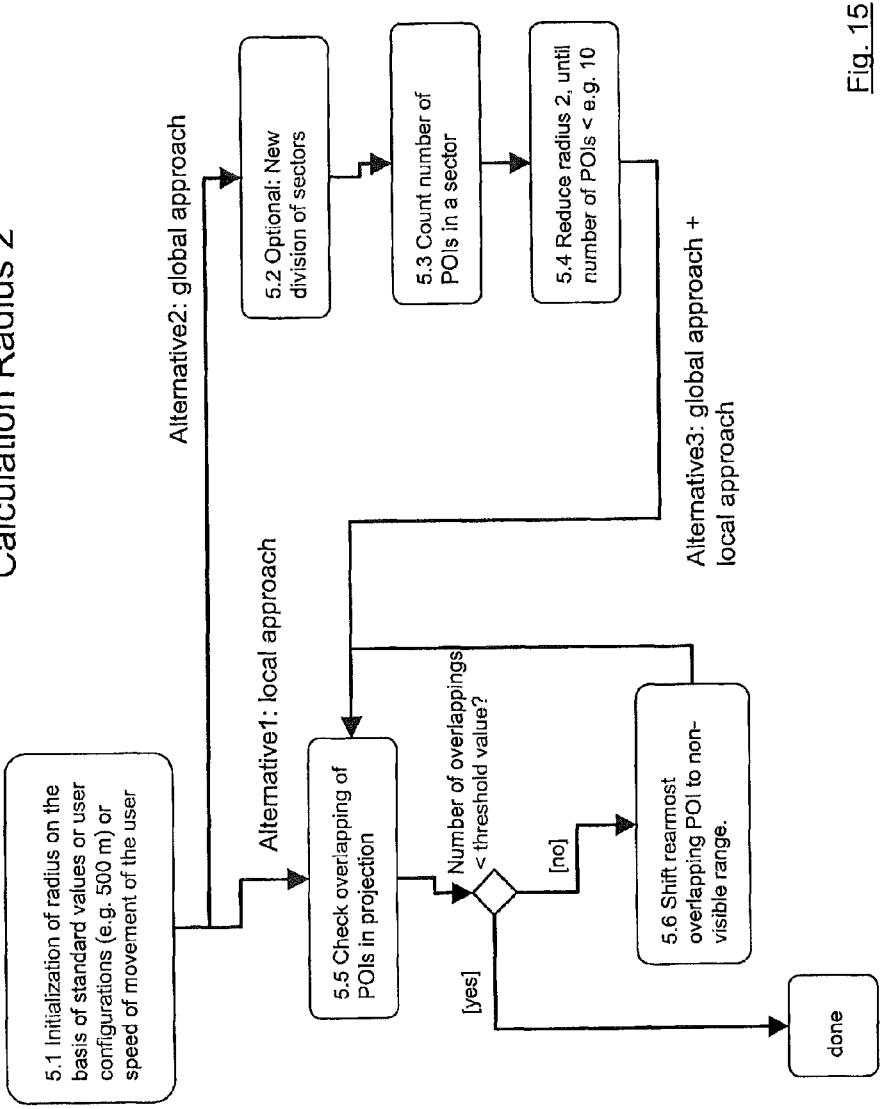
FIG. 15 shows an embodiment illustrating a possible course for calculating radius 2 as exemplified in FIG. 2.

The far region 4 contains POIs that were displaced from the near region or are located outside of radius 1 in the sector. But even here, it is not necessarily expedient to display all existing POI objects. Thus, it may be advantageous to calculate a radius 2, similar to radius 1, as shown in FIG. 15. Due to the fact that radius 2 in particular still is to display POI objects located within the reach of the user, it is advantageously possible to employ for calculating radius 2 the current speed or the average speed of the user or the distance that can be covered by the user within a specific period of time, using public transport, a vehicle or bicycle or the like. The possibility of calculating, in accordance with these factors, which objects can be displayed at all by AR, can also be applied independently of the other claims of the invention.

In an exemplary development of the invention, it is also possible to drag individual POIs from one region to another region (e.g. via a touchscreen) and thereby mark the same for display in the near region. The POI object then will be displayed permanently e.g. in near region 3.

For manual setting of the radii, it is also conceivable to display the same to the user in the correct position as blended in on reality. The user can then alter the radii manually by means of the touchscreen.

Representation of Objects

Figure 5:
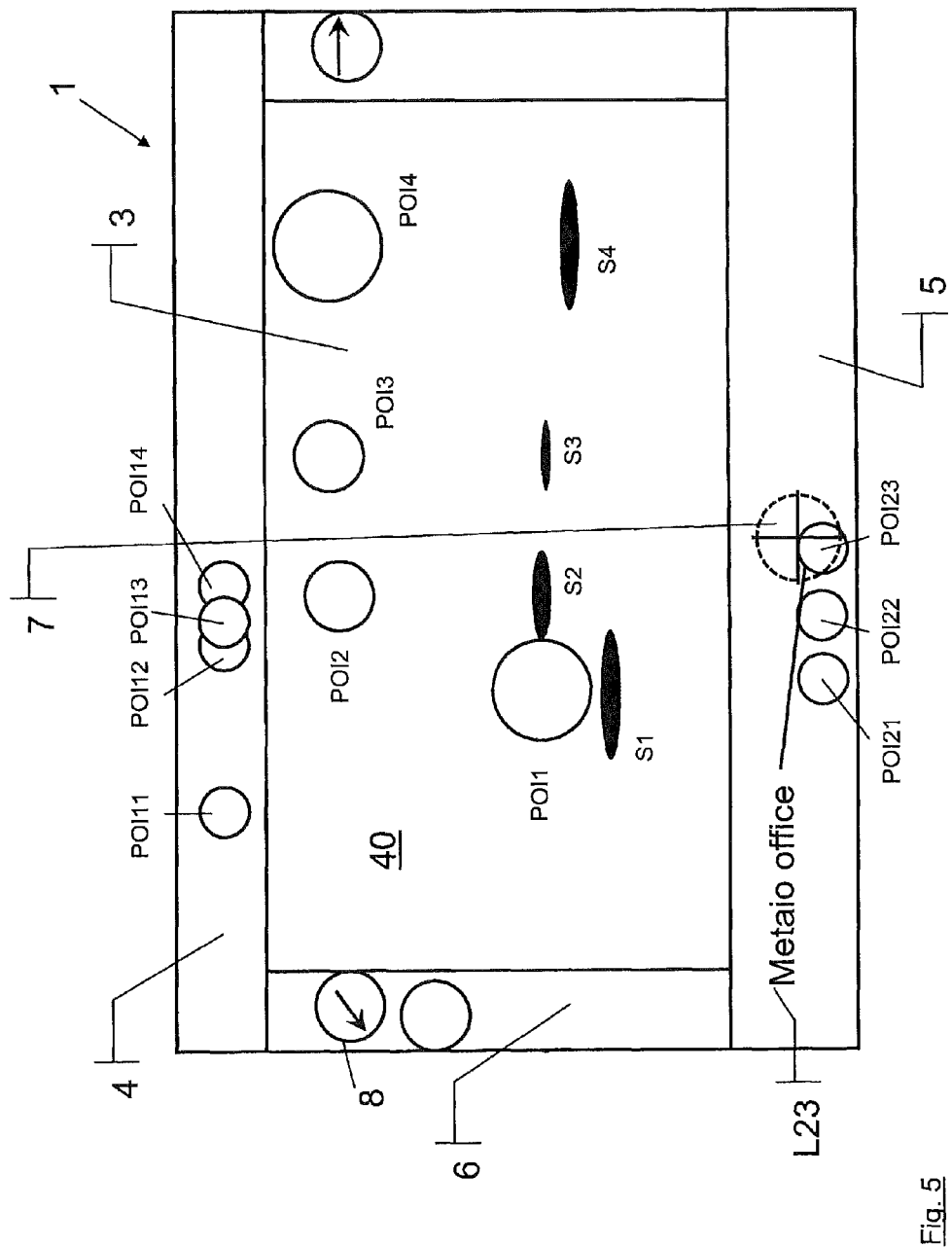
FIG. 5 shows possible elements of the user interface according to FIG. 4 when the focus of operation is located in the location region.
Figure 7:
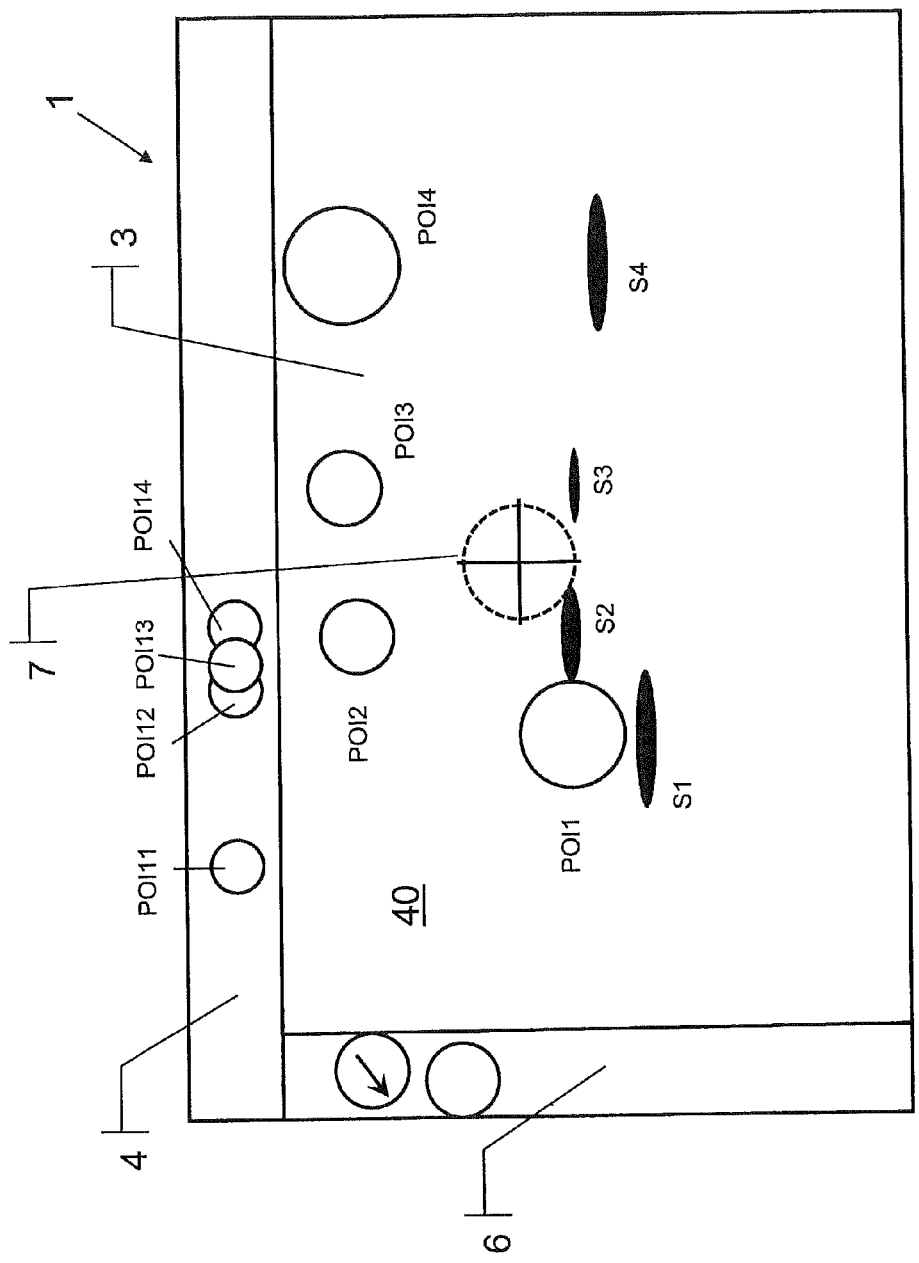
FIG. 7 shows an exemplary possibility of shielding surface elements from the view according to FIG. 4, when these are not required.
Figure 8:
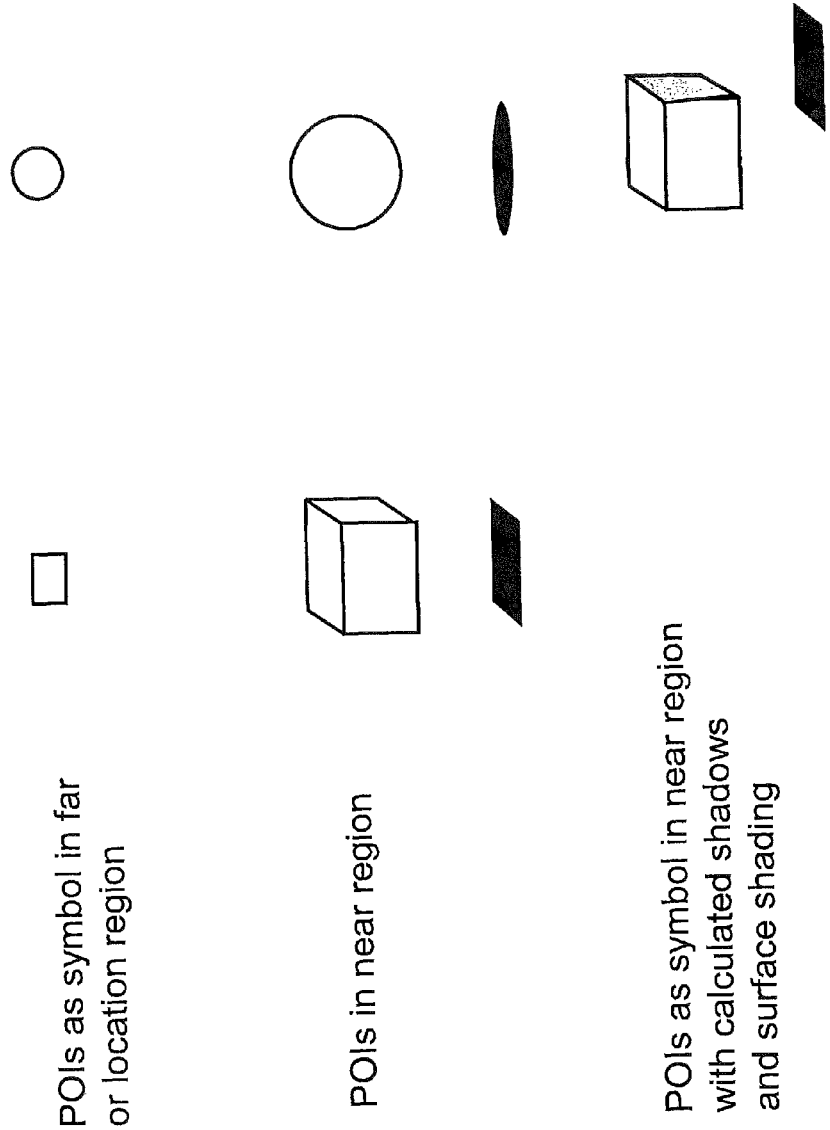
FIGS. 8 to 11 show different representation possibilities for embodiments of items of virtual information (here: POI objects).
Figure 9:
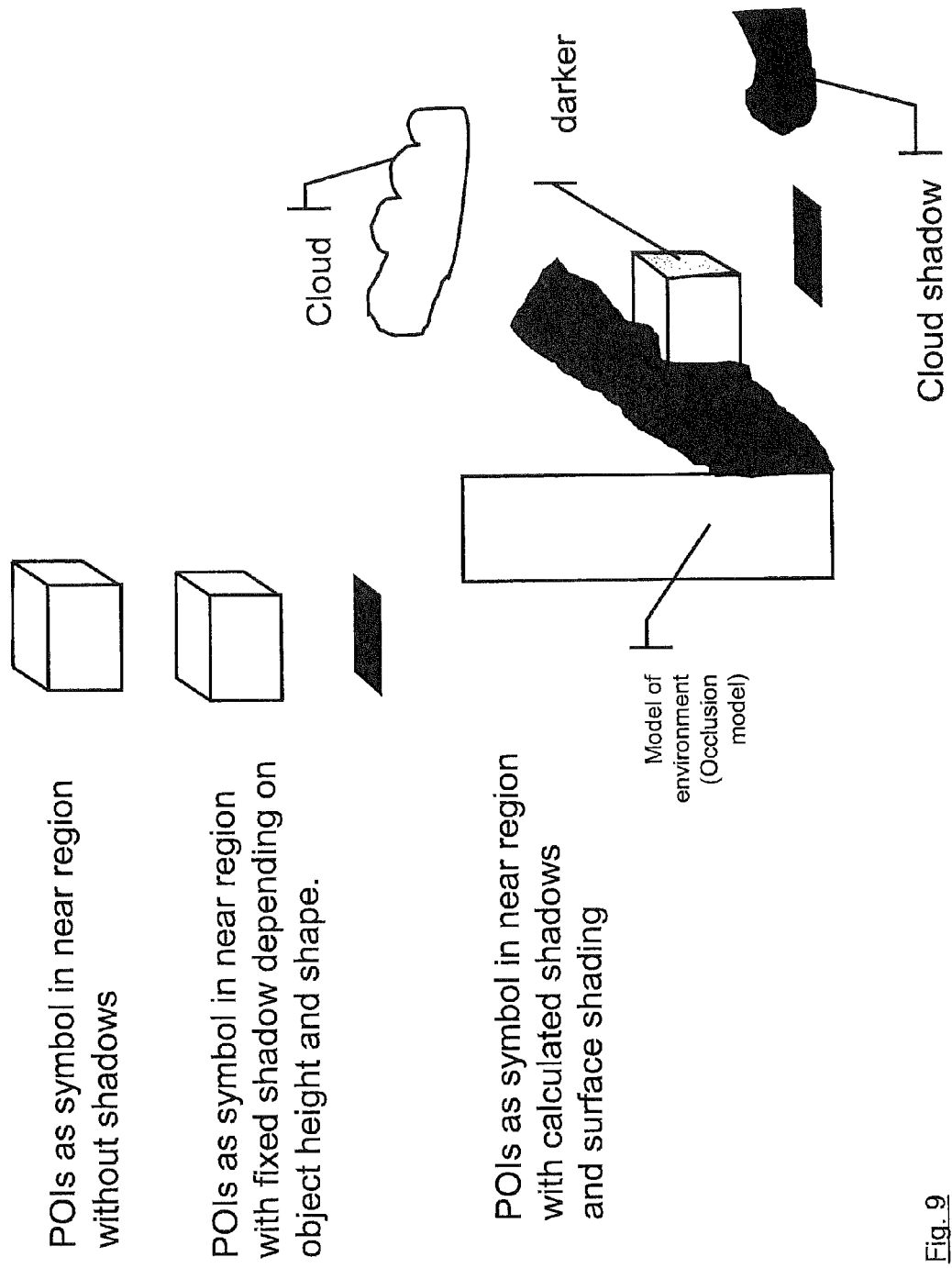

FIG. 4 shows a possible exemplary form of representation for POIs in different regions. POIs in the location region 5 below are represented in a uniform size and non-movably and for time time being independently of the viewing direction. POI objects in near region 3 are overlaid on the environment 40 three-dimensionally and with correct perspective in accordance with the pose, the camera parameters and the model properties. POI objects in far region 4 advantageously are represented in a uniform size and advantageously move along in accordance with the orientation of the device (in particular the display device) such that a vertical line in downward direction would hit the corresponding associated real location. It is advantageously possible to additionally display, on the right and left margins 6, symbols hinting at POI objects outside the aperture angle of the camera. An arrow 8 can give a directional hint so that, when the device is moved around the viewer in the direction of the arrow, the POI object would enter the visible range. These margins 6 may exist for every region (FIG. 4) or e.g. for the near region 3 only (FIG. 5). Near region 3, far region 4 and/or location region 5 can be hidden or shielded optionally, especially when there is no virtual information displayed therein. This can also be effected automatically when there is no POI present in these regions (FIG. 7).

Basically, a point of interest (POI) can be represented by a symbol, an image, a 3D object or the like. For representation, it is possible to use a 3D rendering technology (such as the known methods OpenGL or DirectX) using 3D objects, the rendering of so-called billboards (2D objects that always face the viewer) or so-called 2D overlays with 2D rendering techniques the projection of which is calculated autonomously. The kind of representation may be based on the category of the POIs (e.g. a globe for representing a website) or can be determined by the user (e.g. placing a dinosaur with additional information). In particular, the POIs can be shown in a contrasting color.

As shown in FIGS. 10 and 11, POIs can be provided with additional items of information detailed to different extents (exemplified in the following by way of POI1). The lowest detail level is the POI only. In a next level or stage, labels (cp. label L1) can be displayed (FIG. 10, left) indicating e.g. a descriptive text for the associated POI object. The next stage is the so-called preview (preview cp. V1 or image P1 in FIG. 11) (e.g. an image or rendering of the website or an infotext). Some POI objects may be visualized still more closely in a subsequent stage (cp. information I1). This may also trigger activation of an own program of the operating system, such as starting of an Internet browser or a media player. Depending on the configuration or automatically exploitable criteria, such as the resolution of the display, the POIs can be displayed simultaneously with their additional information, or upon activation only. Advantageously, it can also be determined which POI object is located closest, and only the foremost POI objects indicate firstly labels as of a specific distance, and automatically indicate previews when coming closer.

As an alternative, the display can also be controlled by so-called eye tracking. The POIs viewed by the user are displayed with additional information. The additional information advantageously can be anchored in the view in non-movable manner and can be connected to the movable POI representation by way of a dynamic connection. This provides for enhanced legibility of the information. The use of eye tracking for activating additional information via a POI in AR can also be applied independently of the method according to claim 1.

Figure 17:
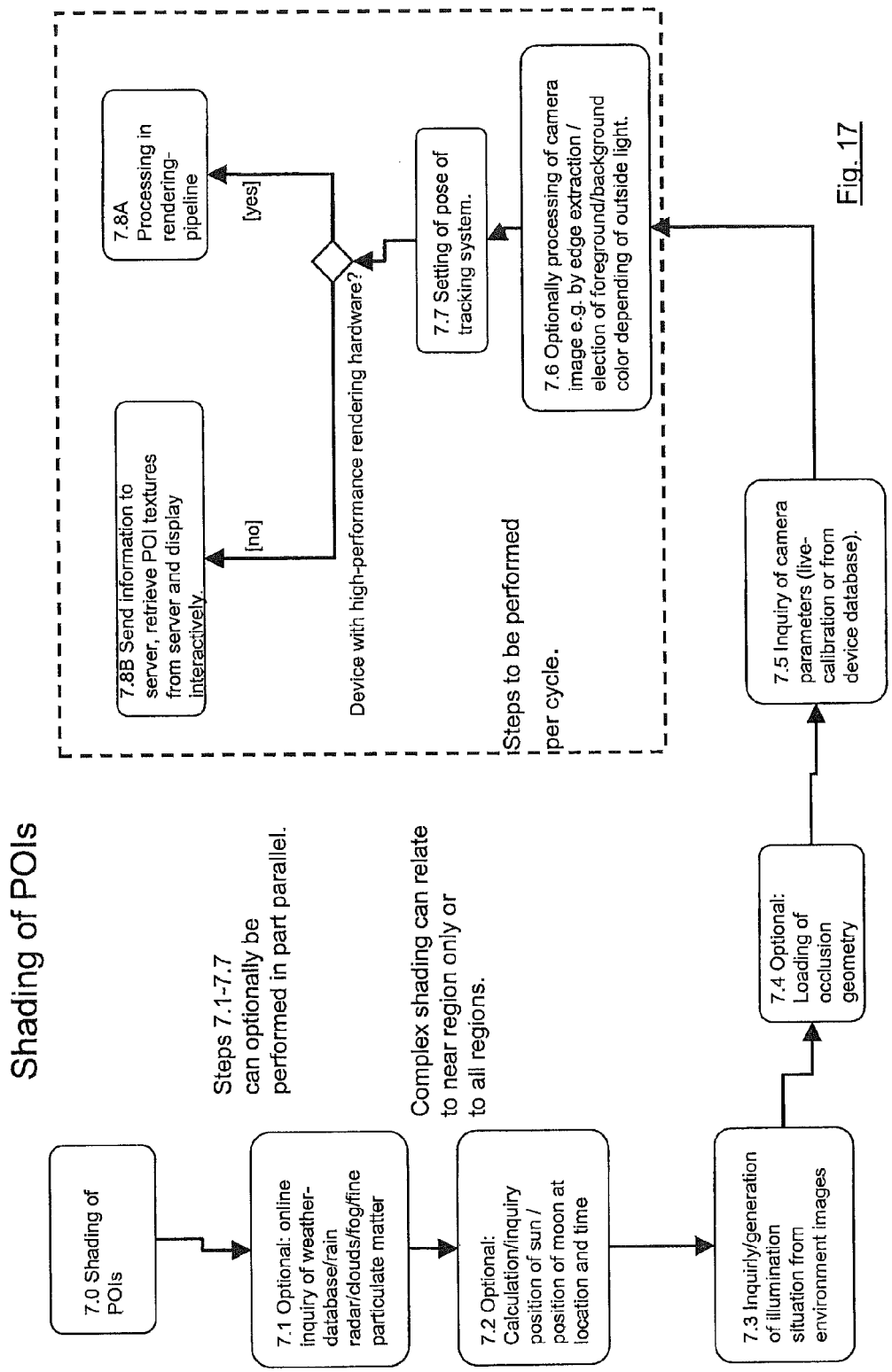
FIG. 17 shows an exemplary possible course for associating shadows and material effects ("shading") with the items of virtual information (here: POI objects).

For improving the association of the POI objects with real locations, it is possible to combine various method steps according to the invention, as illustrated in FIG. 17. The following method steps basically can also be implemented independently of the idea described so far, of dividing the view of the real environment into a plurality of regions (such as near, far and location regions) and to represent the blended in virtual information differently in accordance with the respective region, as described hereinbefore.

There is basically effected (especially in near region 3 when a division into regions is made) a 3D rendering of the POI object with correct perspective. The standard POI objects moreover have a fixed size to permit a continuous estimation of the distance to the same. For increasing the degree of reality and thus improving association, it is advantageously possible to query or retrieve weather data online. Various degrees of complexity are conceivable in this regard for processing. On the basis of the weather situation (e.g. in accordance with the Google weather service "mostly cloudy", "occasional stormy", "occasional rain" etc.) it is possible to assign fixed illumination models or materials (e.g. textures) matching the weather situation. However, at the highest complexity level, is would also be possible to make use of a current cloud or rain satellite or radar image for dynamically preparing an approximated model of the cloud cover and to calculate therefrom the shadows cast and optionally the detailed light conditions (cf. also FIG. 9). As was already mentioned, this can be carried out by a server making available the data to the client in location-specific form. As regards the perception of the distance, it is also useful to ascertain the visibility range in case of fog, rain or haze. This can be effected automatically (cp. "From video image e.g. (Automatic Fog Detection and Estimation of Visibility Distance through use of an Onboard Camera)", Journal Machine Vision and Applications, Publisher Springer Berlin/Heidelberg ISSN 0932-8092 (Print) 1432-1769 (Online), Volume 17, Number 1/April 2006, pages 8-20) or also by means of current weather data.

The easiest technical realization, in addition to further known methods, consists in adjusting the fog settings in OpenGL. In particular for using the visibility distance for reality-conforming representation of the distance, it is also possible to represent part of a virtual object differently by fog, whereas another part is shown clearly. This is to prevent that e.g. when the technology is used in a vehicle, important items of POI information disappear completely due to fog. Technically, this can be realized e.g. by a second rendering pass considering specific materials only, but displaying no fog. As described in step 7.2 of FIG. 17, the position of the sun and the moon, respectively, can be calculated on the basis of the position, the date and the time, and can be used for adjusting the light sources. This has an effect in particular on the shadows (cp. shadows S1-S4 for POI1-POI4 in FIGS. 4, 10 and 11) assisting the user in better determining the position of the POI. The shadows can be pre-calculated textures (advantageously with a transparency value) which, in accordance with the position of the sun or the moon, are located below the POI on ground level where the straight line between sun or moon and POI intersects the ground level (exceptions, if this is not so). In case sun and moon are visible at the same time, the sun will be used for calculation.

However, the shadows may also be calculated dynamically, as known in the prior art. Advantageously, this can include the mutual shading of POIs. When a 3D model of the environment exists (cf. also step 7.4 in FIG. 17, e.g. in the form of a model for occluding a real object; so-called "occlusion geometry"), this can be used in addition for realistic calculation of the shadow situation e.g. in that it casts shadows on POIs (cf. also FIG. 9). In step 7.3, the reality degree of the blending in can be enhanced in addition by augmenting the materials by images of the environment of the POI. The use of so-called environment maps is known to the expert. Novel is that these are dynamically extracted in location-specific manner e.g. from Google Streetview and considered.

In step 7.4 there is taken a further step for enhancing the depth perception of the viewer. By loading occlusion models (so-called "occlusion geometry"), it can be determined whether a POI is visible for the viewer or disappears behind another building, for example. POIs, in case of occlusion of the same, can be shifted directly to the far region 4 or can be marked specificially. For example, the part occluded may be shown semi-transparent, in broken lines or in a different color. Advantageously, the shadows are not calculated and displayed either. The depth model can be deposited or generated dynamically by means of SLAM algorithms, stereo cameras or a time-of-flight camera. In that event, depth information per image pixel is sufficient. In step 7.5, the camera parameters are generated for correct superimposition or overlaying in the near region (this does not have to take place continuously). These parameters can be generated dynamically e.g by means of a SLAM mechanism or retrieved from the server in accordance with the device name or can be deposited in the program. In case of a see-through HMD or HUD, the results of see-through calibration or dynamic measuring of the position of the eye in relation to the display are used.

In step 7.6, the camera image advantageously can be processed such that only the most important image components are shown in contrasting manner. This makes sense in the video see-through mode only, and should assist users in particular in case of very bright surrounding light. Processing of the video image can take place e.g. by means of the Sobel operator for edge extraction. This mode advantageously can be turned on and off in case of bright outside light, e.g. when the device contains a brightness sensor. In step 7.7, the parameters of the pose are made available to the rendering system in addition, if this was not already necessary for the calculations in steps 3 to 6 of FIG. 12. Depending on the hardware properties of the system, everything can be displayed and calculated in step 7.8. If the hardware of the system is weak, calculation of the correct material surfaces can also be effected on the part of the server (step 7.8B), or the entire image can be calculated on the part of the server. In case of a strong system, a modern GPU (Graphic Processor Unit) can take over a large share of the work (step 7.8A). There are numerous possibilities known to the expert in this regard.

Aggregation of POIs

At a time in the course (FIG. 12), advantageously before step 4.0 or after step 5.0, it is also possible to combine POIs, as shown in FIG. 16, at the lower left. The points of a cluster constitute a new, differently shaped POI. This can be effected individually in near region 3, in location region 5 and in far region 4, or can be effected already before the subdivision. Advantageously, this can be effected with POIs of one category only (e.g. websites only). POIs in the most forward region advantageously can be excluded from this process.

Interaction with POIs

Figure 18:
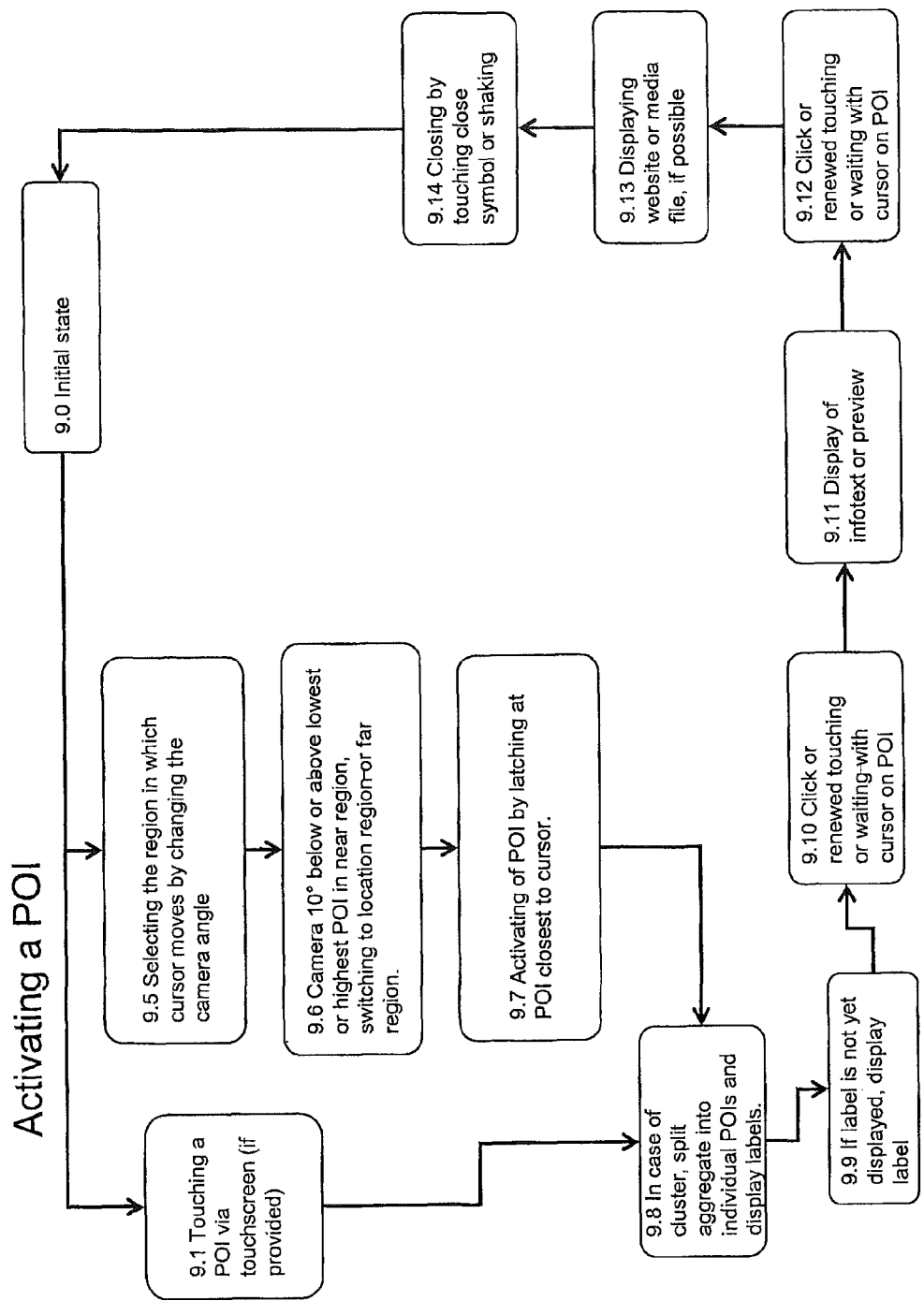
FIG. 18 shows exemplary possible interactions with items of virtual information (here: POI objects).

FIG. 18 shows interaction possibilities with POIs according to aspects of the method of the invention. As is usual in augmented reality, the user can alter the segment of the items of virtual information and reality already by changing his location or the viewing direction. This can also trigger an automatic interaction, as already described in "representation of objects". If the device is equipped with a touchscreen or a kind of mouse control (e.g. a trackball) it is possible in principle to address POIs directly. If several POIs have been combined to form a larger POI object, the individual POIs now are arranged selectably, and the labels are displayed (step 9.8). Otherwise, the label is displayed if the same is not yet displayed (step 9.9). By renewed activation of the POI (step 9.1 or key pressing) the infotext or preview is displayed if it is not yet displayed (step 9.11). By renewed activation, the detailed display is triggered for POIs having corresponding items of information deposited, step 9.13 (e.g. playing a movie, music or showing a website). By touching the closing button or advantageously by shaking the device and registration by movement sensors, the current display can be closed. Alternatively, it could possibly be retained in operation in the background. The user optionally can also provide a setting to the effect that the next audio or video file deposited is executed and run in the background.

Instead of a direct selection by touch, the interaction can also be implemented by means of the target cross 7 (optional) shown in FIG. 7, as described in FIG. 18 in steps 9.5 to 9.7. When the user directs the crosshairs 7 (or a similar target object) in the camera to a POI, the next detail level will be activated there (label in case POI only is visible, preview in case label is visible). Advantageously, the system can also activate the POI on the user interface that is closest to the crosshairs. By prolonged aiming at a POI or pressing a button, the next detail level can be activated. For reaching the far region 4, the user directs the camera upwardly until the highest point POI in the near region 3 has been exceeded by a threshold value (e.g. 10 degrees). The user then can navigate between the POIs by turning right and left. In similar manner, by directing the camera downwardly, the user can reach the location region 5. By turning right and left, the user here too can navigate through the otherwise fixed POIs. A special feature in the location region 5 resides in that a POI, if indicated or adapted to be generated automatically, in addition to POI detail information indicates an image of the location in order to facilitate finding the same (cp. preview V23 and image P23 for POI23 in FIG. 6). The image can be introduced manually or can be generated automatically by means of an image database containing pose information.

The selection of a POI optionally can be effected by voice control as well. To this end, the user activates the control by a specific sentence (e.g. "activate voice control"). Each POI is then marked with a number. By pronouncing the number, the corresponding POI can then be activated.

It is advantageously possible with the system to activate a map mode by directing the same downwards still further. When switching the POI or triggering an interaction, there is advantageously triggered an acoustic signal immediately. Moreover, a haptic signal (e.g. slight vibration) can be issued as well.

In case of a specific interaction with a POI (e.g. three clicks within a short period of time), it is advantageously possible to open a map mode centering the map at the location of the POI. As an alternative, navigation to this POI can be started by specific interaction.

In addition thereto, the invention contains the following aspects and embodiments that can be applied in connection with what has been described so far:

The virtual information (e.g. POIs) can be blended in in the view of the real environment in the far region 4 in a uniform size. With respect to the type of blending in in the view of the real environment, the virtual information in location region 5 is represented differently from its type of blending in in the near region. In particular, the virtual information can be overlaid in the view of the real environment in location region 5 in non-movable manner, in particular also with uniform size and/or irrespective of the orientation of the display device.

It is also possible to combine several items of different virtual information in one virtual object and to display the virtual object in the view instead of the several items of virtual information. The several items of virtual information can be selected from a group of items of virtual information which together form a cluster, with the virtual object having a different shape as compared to the items of virtual information.

Moreover, a geographic map and/or a bird's eye perspective view can be blended in in the display device when the display device is held approximately horizontally with respect to the earth's surface or is held by more than a specific angle below the lowest POI in the near region or, in case this function is already taken for reaching the location region, is held still further below.

A respective boundary, in particular the radius thereof, between the regions can be altered when virtual information is transferred by the user from one of the regions, e.g. the near region, to another region, e.g. the far region, and/or vice versa.

The boundary, in particular the radius thereof, can also be calculated in accordance with the number of items of virtual information within a specific sector of the view. The boundary, in particular the radius thereof, can also be calculated in accordance with the two-dimensional density of several items of virtual information within a specific sector. Moreover, the boundary, in particular the radius thereof, can also be calculated in accordance with several items of virtual information which together constitute a cluster.

In the near region, a shadow can be indicated in the display device below the information, near a ground level shown in the display device, said shadow corresponding to the position of the virtual information.

The display device used may be a video display device in which the view of the real environment is augmented or replaced by an edge image for enhanced contrast.

In a user action for selecting virtual information of for switching between several items of virtual information, the user may be given acoustic and/or haptic feedback at an input device used for making a selection.

By determining the position and orientation of the at least one part of the system setup 20 and 30, respectively, in relation to the real environment, depth information with respect to at least one real object contained in the view can be calculated or loaded, and the depth information can be used for blending in an occlusion model for occluding a real object in the display device in case virtual information is occluded in the view by the real object to be occluded. Such depth information can also be used for calculating a boundary between regions, e.g. between near region and far region.

In addition thereto, several items of blended in virtual information in the display device may have a respective number assigned thereto, and the corresponding virtual information can be selected by voice recognition of the number or selection of the number on a keyboard or a touch-sensitive input pad.

Moreover, several items of virtual information can be associated with one of several categories each, and the items of virtual information can be blended in and/or masked in accordance with the category.

It is also possible to show an edge 6 in the display device, which indicates a range or coverage of the near region 3, with a boundary of the near region being variable by a user action, in particular by dragging the boundary.

For example, the virtual information can be represented in at least three stages. A first stage comprises a body (e.g. a 2D body or a 3D body) as a just local hint to the virtual information (cp. POI1 in FIGS. 10, 11), a second stage comprises a hint to the virtual information in the form a label with inscription (cp. label L1 in FIG. 11), and a third stage comprises an extract-like preview of the virtual information (cp. preview V1 and image P1 in FIGS. 10, 11) which is blended in in particular when the dot-like representation or the label is selected by a user action. A fourth stage then shows the information in full length (cp. information I1 from FIG. 10).

A development may provide that, in a first part of the far region 4, virtual information is represented in the first stage only, in a second part of far region 4 with real objects placed closer to the display device than in the first part of the far region and in a first part of near region 3, virtual information is represented in the second stage, and in a second part of the near region 3 with real objects placed closer to the display device than in the first part of the near region, the virtual information is represented in the third stage.

Moreover, it can be provided that a boundary between near region and far region, in particular a radius of the boundary, is calculated in accordance with a size of the blended in virtual information, a resolution of the display device and/or a resolution of a camera used for generating the view.

Furthermore, the limit of the location region can be increased with increased measurement uncertainty of position detection.

Furthermore, the boundary, which in particular may be a radius and determines which objects are to be displayed at all, may be dependent on the current speed or the average speed of the user or the distance that can be covered by the user within a specific period of time, using public transport, a vehicle or bicycle or the like.

Furthermore, irrespective of the other disclosures, the system can superimpose virtual information on reality, and in blending in virtual information in a view of a real environment, weather data can be considered that are retrieved e.g. via the Internet ("online") in order to increase the degree of reality of blended in virtual information with respect to the real environment and thereby improve the association therewith. The features and embodiments described hereinbefore in connection with weather data and the like can also be applied in connection with this aspect independently of other aspects described.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A method for representing virtual information in a real environment, comprising the following steps:

providing at least one view of a real environment and a system setup for blending in virtual information for superimposing with the real environment in at least part of the view, the system setup comprising at least one display device;

determining a position and orientation of at least one part of the system setup relative to at least one component of the real environment;

subdividing at least part of the view of the real environment into a plurality of regions comprising a first region and a second region, with objects of the real environment within the first region being placed closer to the system setup than objects of the real environment within the second region; and blending in at least one item of virtual information on the display device in at least part of the view of the real environment, considering the position and orientation of said at least one part of the system setup;

wherein the virtual information is shown differently in the first region than in the second region with respect to the type of blending in the view of the real environment; and wherein the at least one item of virtual information is transferable from one of said regions to another one of said regions by the user selecting the virtual information and transferring the same by a transfer action.

2. The method of claim 1, wherein the at least one item of virtual information is blended in the view of the real environment in the first region with the correct perspective corresponding to the position and orientation of the display device relative to the real environment, in particular in various sizes in accordance with the perspective positioning of the virtual information in the view.

3. The method of claim 1, wherein the at least one virtual information is blended in the view of the real environment in the second region in a uniform size.

4. The method of claim 1, wherein the plurality of regions into which said at least part of the view of the real environment is subdivided, in addition to said first region and said second region, comprise a third region within which objects of the real environment are placed closer to the system setup than objects of the real environment within said first region, and wherein the at least one item of virtual information is shown differently in the third region than in the first region with respect to the type of blending in the view of the real environment.

5. The method of claim 4, wherein the at least one item of virtual information is blended in the view of the real environment in the location region in non-movable manner.

6. The method of claim 1, wherein several items of different virtual information are combined to form a virtual object and the virtual object is displayed in the view instead of the several items of virtual information.

7. The method of claim 1, wherein the first region is separated from the second region by a boundary, said boundary being calculated dynamically.

8. The method of claim 7, wherein the boundary is altered when virtual information is transferred by the user from one of said regions to another one of said regions.

9. The method of claim 7, wherein the boundary is calculated in accordance with the number of items of virtual information within a particular sector of the view.

10. The method of claim 7, wherein the boundary is calculated in accordance with the two-dimensional density of several items of virtual information within a particular sector of the view.

11. The method of claim 7, wherein the boundary is calculated in accordance with several items of virtual information which together constitute a cluster.

12. The method of claim 1, wherein the display device used is a video display device in which the view of the real environment is augmented or replaced by an edge image for enhanced contrast.

13. The method of claim 1, wherein, by determining the position and orientation of said at least one part of the system setup relative to said at least one component of the real environment, depth information with respect to at least one real object contained in the view is calculated or loaded, said depth information being used for calculating a boundary between first region and second region.

14. The method of claim 1, wherein said at least one item of virtual information is adapted to be displayed in at least three stages, a first stage comprising a body merely as a local hint to the virtual information, a second stage comprising a hint to the virtual information in the form of a label with inscription, and a third stage comprising an extract-like preview of the virtual information.

15. The method of claim 14, wherein in a first part of the second region, virtual information is displayed in the first stage only, in a second part of the second region having real objects placed closer to the display device than in the first part of the second region and in a first part of the first region, virtual information is displayed in the second stage, and in a second part of the first region having real objects placed closer to the display device than in the first part of the first region, the virtual information is displayed in the third stage.

16. The method of claim 1, wherein dynamic weather information with respect to the real environment is considered in blending in the at least one item of virtual information in the view of the real environment.

17. The method of claim 1, wherein a boundary of the third region increases with increasing measurement uncertainty of position detection.

18. The method of claim 1, wherein a boundary determining which virtual information is to be displayed at all, is dependent upon the current speed or the average speed of the user or the distance that may be covered by the user within a specific period of time, using public transport, a vehicle or bicycle or the like.

19. A method for representing virtual information in a real environment, comprising the following steps:

providing at least one view of a real environment and a system setup for blending in virtual information for superimposing with the real environment in at least part of the view, the system setup comprising at least one display device;

determining a position and orientation of at least one part of the system setup relative to at least one component of the real environment;

subdividing at least part of the view of the real environment into a plurality of regions comprising a first region and a second region, with objects of the real environment within the first region being placed closer to the system setup than objects of the real environment within the second region; and blending in at least one item of virtual infonnation on the display device in at least part of the view of the real environment, considering the position and orientation of said at least one part of the system setup;

wherein the virtual information is shown differently in the first region than in the second region with respect to the type of blending in the view of the real environment; and wherein the display device displays an edge indicating a coverage of the first region, with a boundary of the first region being adapted to be altered by user action, in particular by dragging the boundary.

20. The method of claim 19, wherein the at least one item of virtual information is blended in the view of the real environment in the first region with the correct perspective corresponding to the position and orientation of the display device relative to the real environment, in particular in various sizes in accordance with the perspective positioning of the virtual information in the view.

21. The method of claim 19, wherein the at least one virtual information is blended in the view of the real environment in the second region in a unifoim size.

22. The method of claim 19, wherein the plurality of regions into which said at least part of the view of the real environment is subdivided, in addition to said first region and said second region, comprise a third region within which objects of the real environment are placed closer to the system setup (20, 30) than objects of the real environment within said first region, and wherein the at least one item of virtual information is shown differently in the third region than in the first region with respect to the type of blending in the view of the real environment.

23. The method of claim 22, wherein the at least one item of virtual information is blended in the view of the real environment in the location region in non-movable manner 24. A method for representing virtual information in a real environment, comprising the following steps:
- providing at least one view of a real environment and a system setup for blending in virtual information for superimposing with the real environment in at least part of the view, the system setup comprising at least one display device;
- determining a position and orientation of at least one part of the system setup relative to at least one component of the real environment;
- subdividing at least part of the view of the real environment into a plurality of regions comprising a first region and a second region, with objects of the real environment within the first region being placed closer to the system setup than objects of the real environment within the second region; and
- blending in at least one item of virtual information on the display device in at least part of the view of the real environment, considering the position and orientation of said at least one part of the system setup;
- wherein the virtual information is shown differently in the first region than in the second region with respect to the type of blending in the view of the real environment; and
- wherein a boundary between first region and second region is calculated in accordance with a size of the blended in virtual information, a resolution of the display device and/or a resolution of a camera used for generating the view.

25. The method of claim 24, wherein the at least one item of virtual information is blended in the view of the real environment in the first region with the correct perspective corresponding to the position and orientation of the display device relative to the real environment, in particular in various sizes in accordance with the perspective positioning of the virtual information in the view.

26. The method of claim 24, wherein the at least one virtual information is blended in the view of the real environment in the second region in a uniform size.

27. The method of claim 24, wherein the plurality of regions into which said at least part of the view of the real environment is subdivided, in addition to said first region and said second region, comprise a third region within which objects of the real environment are placed closer to the system setup (20, 30) than objects of the real environment within said first region, and wherein the at least one item of virtual information is shown differently in the third region than in the first region with respect to the type of blending in the view of the real environment.

28. The method of claim 27, wherein the at least one item of virtual information is blended in the view of the real environment in the location region in non-movable manner.

* * * * *